(12) United States Patent
Pfaller et al.

(10) Patent No.: US 10,836,475 B2
(45) Date of Patent: Nov. 17, 2020

(54) MULTIROTOR AIRCRAFT WITH AN AIRFRAME AND AT LEAST ONE WING

(71) Applicant: AIRBUS HELICOPTERS DEUTSCHLAND GMBH, Donauworth (DE)

(72) Inventors: Rupert Pfaller, Riemerling (DE); Uwe Kiesewetter, Rain am Lech (DE); Sebastian Mores, Munich (DE); Marius Bebesel, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 256 days.

(21) Appl. No.: 16/143,531

(22) Filed: Sep. 27, 2018

(65) Prior Publication Data
US 2019/0112039 A1 Apr. 18, 2019

(30) Foreign Application Priority Data
Oct. 13, 2017 (EP) ..................................... 17400058

(51) Int. Cl.
*B64C 27/26* (2006.01)
*B64C 27/20* (2006.01)
(Continued)

(52) U.S. Cl.
CPC ................ *B64C 27/26* (2013.01); *B64C 3/14* (2013.01); *B64C 27/20* (2013.01); *B64C 27/82* (2013.01);
(Continued)

(58) Field of Classification Search
CPC ........... B64C 27/26; B64C 3/14; B64C 27/20; B64C 27/82
See application file for complete search history.

(56) References Cited

U.S. PATENT DOCUMENTS 3,080,137 A 3/1963 Hurel et al.
6,561,456 B1 5/2003 Devine
(Continued)

FOREIGN PATENT DOCUMENTS

CA 2947974 A1 2/2016
DE 102005022706 A1 11/2006
(Continued)

OTHER PUBLICATIONS

European Search Report for European Application No. EP17400058, Completed by the European Patent Office, dated Mar. 14, 2018, 7 pages.
(Continued)

*Primary Examiner* — Justin M Benedik
(74) *Attorney, Agent, or Firm* — Brooks Kushman P.C.

(57) ABSTRACT

A multirotor aircraft with an airframe and at least one wing that is mounted to the airframe, the at least one wing being provided with at least four thrust producing units that are arranged in spanwise direction of the at least one wing, wherein each one of the at least four thrust producing units comprises at least one rotor assembly that is accommodated in an associated shrouding, the associated shrouding being integrated into the at least one wing, wherein the associated shrouding defines an air duct that is axially delimited by an air inlet region and an air outlet region, wherein the air inlet region exhibits in circumferential direction of the air duct at least two different aerodynamic profiles.

14 Claims, 15 Drawing Sheets

(51) Int. Cl.
B64C 29/00 (2006.01)
B64C 3/14 (2006.01)
B64C 27/82 (2006.01)

(52) U.S. Cl.
CPC .... B64C 29/0025 (2013.01); *B64C 2003/148* (2013.01); *B64C 2027/8236* (2013.01)

(56) References Cited

U.S. PATENT DOCUMENTS

| | | | |
|---|---|---|---|
| 6,568,630 B2 | 5/2003 | Yoeli | |
| 6,886,776 B2* | 5/2005 | Wagner | B64C 3/56 |
| | | | 244/12.4 |
| 7,857,253 B2 | 12/2010 | Yoeli | |
| 7,946,528 B2 | 5/2011 | Yoeli | |
| D678,169 S | 3/2013 | Kennelly et al. | |
| 8,393,564 B2 | 3/2013 | Kroo | |
| D696,618 S | 12/2013 | Wang | |
| 8,733,690 B2 | 5/2014 | Bevirt et al. | |
| 8,991,741 B2* | 3/2015 | Wang | B64C 3/56 |
| | | | 244/7 R |
| 2003/0062443 A1* | 4/2003 | Wagner | B64C 3/56 |
| | | | 244/12.3 |
| 2005/0040283 A1 | 2/2005 | Frazer | |
| 2006/0226281 A1* | 10/2006 | Walton | B64C 29/0033 |
| | | | 244/17.23 |
| 2007/0018035 A1* | 1/2007 | Saiz | B64C 29/0033 |
| | | | 244/12.3 |
| 2007/0034738 A1 | 2/2007 | Sanders, Jr. et al. | |
| 2007/0246601 A1 | 10/2007 | Layton | |
| 2011/0042509 A1* | 2/2011 | Bevirt | B64C 29/0033 |
| | | | 244/12.4 |
| 2012/0043413 A1* | 2/2012 | Smith | B64C 29/0033 |
| | | | 244/12.4 |
| 2013/0118856 A1 | 5/2013 | Long | |
| 2013/0140404 A1 | 6/2013 | Parks | |
| 2015/0127209 A1 | 5/2015 | Al-Garni et al. | |
| 2016/0207625 A1 | 7/2016 | Judas et al. | |

FOREIGN PATENT DOCUMENTS

| | | |
|---|---|---|
| DE | 102013108207 A1 | 2/2015 |
| EP | 2551190 A1 | 1/2013 |
| EP | 2551193 A1 | 1/2013 |
| EP | 2551198 A1 | 1/2013 |
| EP | 2234883 B1 | 8/2017 |
| GB | 905911 | 9/1962 |
| KR | 101451646 B1 | 10/2014 |
| WO | 2006113877 A2 | 10/2006 |
| WO | 2006113877 A3 | 10/2006 |
| WO | 2015028627 A1 | 3/2015 |
| WO | 2016009376 A1 | 1/2016 |
| WO | 2016009376 A9 | 1/2016 |
| WO | 2016059040 A1 | 4/2016 |
| WO | 2016153580 A2 | 9/2016 |

OTHER PUBLICATIONS

Notice of Preliminary Rejection for Korean Application No. 10-2018-0088726, dated Jul. 17, 2019, 4 Pages.

* cited by examiner

MULTIROTOR AIRCRAFT WITH AN AIRFRAME AND AT LEAST ONE WING

CROSS-REFERENCE TO RELATED APPLICATIONS

This application claims priority to European patent application No. EP 17400058.8 filed on Oct. 13, 2017, the disclosure of which is incorporated in its entirety by reference herein.

BACKGROUND OF THE INVENTION

(1) Field of the Invention

The invention is related to a multirotor aircraft with an airframe and at least one wing that is mounted to the airframe, the at least one wing being provided with at least four thrust producing units for producing thrust in a predetermined direction.

(2) Description of Related Art

Various conventional multirotor aircrafts are known, e. g. from the documents EP 2 234 883 A1, U.S. Pat. No. 6,568,630 B2, U.S. Pat. No. 7,857,253 B2, U.S. Pat. No. 7,946,528 B2, and DE 10 2013 108 207 A1. Other multirotor aircrafts are also known from the state of the art, such as e. g. the Boeing CH-47 tandem rotor helicopter. Furthermore, so-called drones and, more particularly, so-called quad drones are also well-known, such as e. g. described in the documents US 2015/0127209 A1, DE 10 2005 022 706 A1, and KR 101 451 646 B1. Moreover, various multirotor aircraft studies and fictions exist, such as e. g. the skyflyer SF MK II from Skyflyer Technology GmbH and the multicopter shown in the Avatar movie.

In addition, also wing-based multirotor aircrafts are known from the state of the art. Examples are the Bell XV-3 tilt rotor aircraft as well as the tilt rotor aircrafts described in the documents U.S. Pat. No. 8,733,690 B2, EP 2 551 190 A1, EP 2 551 193 A1, EP 2 551 198 A1, U.S. Pat. No. D696,618 S, and CA 2 947 974 A1; the Bell XV-22 quad tilt with ducted rotors; the aircraft having a lift producing rotor disposed in a supporting surface described in the document GB 905 911; the aerodynamically stable vertical take-off and landing aircraft described in the document US 2007/0034738 A1; the multirotor personal air vehicle described in the document WO 2016/153580 A2; the flying apparatus described in the document WO 2016/059040 A1; the aircraft capable of vertical take-off described in the document WO 2015/028627 A1; and the vertical take-off and landing aircrafts described in the documents U.S. Pat. No. D678 169 S, US 2013/0118856 A1, U.S. Pat. No. 8,393,564 B2, WO 2016/009376 A1 and US 2013/0140404 A1.

Each one of these conventional multirotor aircrafts is equipped with two or more thrust producing units that are provided for producing thrust in a predetermined direction during operation of the multirotor aircraft. In general, each thrust producing unit includes one or more rotors or propellers and is, usually, designed for specific flight conditions. By way of example, a thrust producing unit that is designed as an airplane propeller operates at its optimum in cruise conditions, whereas a thrust producing unit that is designed as propeller of a compound helicopter is rather optimized for hover or forward flight conditions, while a thrust producing unit that implements e. g. a so-called Fenestron® tail rotor is particularly designed for hover conditions.

In all of these examples, the respective thrust producing unit is optimized for operation in axial air flow conditions, i. e. in an air flow direction that is oriented at least approximately along a rotor axis resp. rotation axis of the given one or more rotors or propellers and, therefore, referred to as an axial air flow direction. If, however, the respective thrust producing unit is operated in transversal air flow conditions, i. e. in an air flow direction that is oriented transverse to the rotor axis of the given one or more rotors or propellers and, therefore, referred to as a non-axial air flow direction, a respective efficiency of the thrust producing unit usually decreases considerably.

By way of example, the usual flight path of a multirotor aircraft with two or more thrust producing units consists in taking off vertically, performing forward flight to a given destination, and then landing vertically. The vertical take-off and landing phases may e. g. be combined with respective hovering phases.

During the vertical take-off phase, for instance, the thrust producing units of the multirotor aircraft will be subjected to axial air flow conditions. Then, after the vertical take-off and/or a respective hovering phase, the multirotor aircraft needs to be accelerated in a predetermined forward flight direction to perform forward flight to the given destination. Required propulsion forces for the acceleration and for the compensation of occurring drag forces during the forward flight are usually generated by tilting resp. inclining the thrust producing units from a vertical take-off position into a forward flight position. In other words, respective thrust vectors generated by the thrust producing units are inclined in a predetermined direction by rotating the thrust producing units accordingly, so that the multirotor aircraft gains velocity and leaves a previous vertical take-off or hovering phase such that is converts to forward flight, wherein the thrust producing units are subjected to transversal air flow conditions.

Upon arrival at the given destination, the thrust producing units are usually tilted back from the forward flight position into the vertical take-off position. Thus, landing at the given destination can be performed.

However, the provision of tiltable thrust producing units results in high system complexity and system weight due to a need of controlling and surveillance of required active actuation means. In particular, already the provision of such required active actuation means usually significantly increases an underlying system complexity and weight, so that respective maintenance costs of such multirotor aircrafts are generally very high, thus, limiting usage of such multirotor aircrafts at least mainly to military or governmental applications. Therefore, current multirotor aircrafts are predominantly provided with fixed attachment units for rigidly attaching respective thrust producing units to corresponding multirotor aircraft airframes.

In case of such a fixed attachment unit that rigidly attaches a respective thrust producing unit to an airframe of a given multirotor aircraft, tilting of one or more of the thrust producing units corresponds to inclining the complete airframe, i. e. inclining of the entire multirotor aircraft. However, in particular for recently appearing multirotor aircraft concepts related to fast flying and/or passenger carrying multirotor aircrafts, such an inclining of the entire multirotor aircraft implies multiple technical problems and disadvantages, as described hereinafter.

More specifically, when using such a fixed attachment unit with a given multirotor aircraft, the entire multirotor aircraft must be inclined during forward flight so that a respectively required propulsive force can be generated.

However, the faster the given multirotor aircraft is intended to fly, the higher an underlying degree of inclination must be chosen, in particular for fast forward flight. Unfortunately, a higher degree of inclination automatically leads to higher drag which, in turn, limits an obtainable performance of the given multirotor aircraft.

Furthermore, with respect to passenger comfort, a typical maximum inclination angle for cabin inclination with respect to the passenger's acceptance and comfort ranges between +/−5°. However, when using a fixed attachment unit with a given multirotor aircraft, this typical maximum inclination angle would limit an achievable magnitude of a maximum achievable propulsive force, which is the horizontal component of a respectively generated thrust vector at a given inclination angle, thus, significantly limiting an overall achievable performance of the given multirotor aircraft. Furthermore, the fixed attachment unit will directly propagate vibration of the thrust producing units into a respective passenger cabin of the given multirotor aircraft, which will further degrade the passenger comfort.

Moreover, when using a fixed attachment unit with a given multirotor aircraft, the latter requires additional manoeuvring engine overpower for enabling manoeuvring flight. This overpower must be defined according to weight and inertia of the entire multirotor aircraft. In other words, comparatively high manoeuvring overpowers must be designed according to a respective total mass of the given multirotor aircraft.

Finally, when using a fixed attachment unit with a given multirotor aircraft, the entire multirotor aircraft must be moved or rotated to compensate any influence of gust during operation. However, this will lead to a comparatively high power consumption.

As a consequence, a major disadvantage of all above-described conventional multirotor aircrafts consists in that they are not readily suitable for being used in currently emerging air transportation concepts. More specifically, such currently emerging air transportation concepts relate in particular to transportation of passengers, but also of products and goods, in urban areas and, more particularly, in big cities and/or so-called mega-cities. Thus, multirotor aircrafts that are intended for use in such currently emerging transportation concepts underlie particularly strict applicable authority regulations, certification requirements and safety demands.

More specifically, a primary mission of a multirotor aircraft that is intended for use in such currently emerging transportation concepts is the air transport of a comparatively small number of passengers, e. g. up to four, or a comparative volume of products and goods, over a comparatively short range. Furthermore, the multirotor aircraft that is intended for use in such currently emerging transportation concepts should be powered electrically, at least for reduction of environmental pollution and noise generation. However, for electrical flight only limited energy is available due to an underlying energy density of respectively provided electrical accumulators as electrical power sources. As a consequence, the comparatively short range is generally limited to a maximum of half an hour of flight time.

Furthermore, during a typical transportation flight, a respective hovering time of the multirotor aircraft that is intended for use in such currently emerging transportation concepts will usually be very short and most of the time the multirotor aircraft will be performing forward flight. Therefore, a high efficiency is required for both, hovering and forward flight. In addition, a suitable autorotation capability would significantly increase the safety of a multirotor aircraft that is intended for use in such currently emerging transportation concepts. However, such a suitable autorotation capability is very limited respectively impossible for all above-described conventional multirotor aircrafts.

BRIEF SUMMARY OF THE INVENTION

It is, therefore, an object of the present invention to provide a new multirotor aircraft that is safe and reliable and suitable for transportation of passengers in urban areas.

This object is solved by a multirotor aircraft comprising the features of claim 1. More specifically, according to the present invention a multirotor aircraft comprises an airframe and at least one wing that is mounted to the airframe. The at least one wing is provided with at least four thrust producing units for producing thrust in a predetermined direction. The at least four thrust producing units are arranged in spanwise direction of the at least one wing, wherein each one of the at least four thrust producing units comprises at least one rotor assembly that is accommodated in an associated shrouding, the associated shrouding being integrated into the at least one wing. The associated shrouding defines an air duct that is axially delimited by an air inlet region and an air outlet region. The air inlet region exhibits in circumferential direction of the air duct at least two different aerodynamic profiles.

According to one aspect, the inventive multirotor aircraft exhibits aerodynamic features, such as e. g. a high angle of the at least one wing with respect to the lateral axis of the inventive multirotor aircraft, which allows the latter even in case of a failure to land safely in a manner that resembles to a landing of a sailplane. This remedies to an important general problem of multicopters, which is the lag of the possibility to perform autorotation, as described above. Thus, a reliable and secure fail-safe feature can be implemented, which is readily available in cases where the thrust producing units, respective power supplies and/or respective power sources fail.

Advantageously, the inventive multirotor aircraft comprises the at least one wing in addition to the at least four thrust producing units for producing thrust in a predetermined direction. Preferably, provision of the at least four thrust producing units corresponds to providing at least two such thrust producing units oriented in spanwise direction in each half wing of the at least one wing. In particular, provision of the at least one wing enhances an underlying energy efficiency of the inventive multirotor aircraft in forward flight with the lift of the wing(s). This lift could be supported by a slight vertical airflow through the wing(s) in upward direction when the thrust producing units that are arranged inside of the wing(s) are working with moderate RPM.

A preferred implementation includes a so-called tandem wing configuration. In this configuration, two wings are provided with an at least approximately identical wing span, as well as a preferentially identical number of thrust producing units. This leads to a maximum thrust producing unit area for a given elongation of an associated heliport. This is important for an enhanced efficiency in hover.

Advantageously, the thrust producing units and, thus, respective rotor assemblies thereof, are encompassed by the wing(s). Accordingly, they are less dangerous for people staying around the inventive multirotor aircraft during take-off and/or landing. Furthermore, any risk of a contact of the thrust producing units to obstacles during forward flight, which might destroy the thrust producing units, is significantly reduced. Moreover, due to the integration of the thrust producing units to the wing(s), an effect similar to a fenestron effect can be achieved. More specifically, at a fenestron nearly half of a generated thrust is coming from the airflow over the plane and only half of the thrust has to be delivered from a respective rotor assembly itself. Thus, the thrust producing units of the inventive multirotor aircraft would provide for an increase of efficiency in hover. In addition, by providing the at least four thrust producing units, a so-called footprint of the inventive multirotor aircraft, which is important for some landing platforms, can be smaller.

According to one aspect, all thrust producing units that are in operation acting for vertical lift, i. e. which are provided with rotor assemblies exhibiting an at least essentially mainly horizontally aligned rotation area, are preferably incorporated in a short duct which is located inside of the at least one wing or in a respective transition area between the airframe and the at least one wing. In addition, outside of each respectively most outside arranged thrust producing unit located in the at least one wing, there may be an extension of the wing horizontally and also in vertical direction. Especially, if a front wing and a rear wing are provided, such extensions of the wing provided at the rear wing in vertical direction, such as e. g. winglets, may act in operation like a vertical fin resp. a vertical stabilizer.

Advantageously, the short duct can be implemented comparatively short as it is located inside of the at least one wing. More specifically, the short duct is integrated into aerodynamic profiles provided at front, rear and lateral sides of the duct. The aerodynamic profile at the front end of the short duct is preferably slightly cut at its trailing edge and the duct is preferentially located at least 10% of the length of the respective cut profile behind a highest thickness of the aerodynamic profile concerned, with respect to a section through the center of an associated rotating axis. The aerodynamic profiles at the lateral sides of the short duct preferably exhibit a minimum height which is equal or higher than an underlying height of the short duct. The aerodynamic profile at the rear end of the short duct preferably exhibits a small flat area with a height that is preferentially not greater than the height of a respectively associated rotor assembly at the outside end in addition to the deflection of this rotor assembly during normal flight conditions. However, a minimum height of the flat area at the core of the rear profile can be zero. This minimum height of the flat area as part of the short duct is preferably located at the rear part of the short duct and preferentially reaches its maximum height at the side areas that are oriented towards the lateral sides of the short duct. The different aerodynamic profiles at the front area and at the rear area are according to one aspect embodied with a smooth transition to respective aerodynamic profiles provided at lateral sides, i. e. without edges or kinks. Likewise, the vertical flat areas at the front and at the rear sides are preferably embodied as smooth transitions, i. e. without edges or kinks, to the respective flat and nearly vertically embodied areas at the lateral sides.

According to one aspect, the at least one short duct may be provided with an unsymmetrical duct cross-section, i. e. a respective duct area that is unsymmetrically implemented with respect to the longitudinal axis of the short duct. Thus, respective aerodynamic profile areas around the short duct as well as struts holding e. g. an associated motor/gearbox of a respective rotor assembly can be arranged unsymmetrically in order to influence an incoming airflow especially in forward flight.

Furthermore, the inventive multirotor aircraft can be equipped with an additional thrust producing unit that is preferably also provided with a duct and that is preferentially arranged in longitudinal direction of the airframe of the multirotor aircraft. This additional thrust producing unit is preferably provided for operating similar to a conventional propeller provided at a conventional airplane.

Advantageously, this additional thrust producing unit and the thrust producing units that are arranged in the at least one wing can work as independent systems such that a redundancy can be implemented. Thus, if the thrust producing units that are arranged in the at least one wing fail, the inventive multirotor aircraft can still fly forward with the help of the additional thrust producing unit, where lift is provided by the at least one wing. Vice versa, if the additional thrust producing unit fails, the inventive multirotor aircraft can still fly and land with the help of the thrust producing units that are arranged in the at least one wing.

Moreover, according to one aspect the inventive multirotor aircraft comprises a plurality of electrical accumulators as electrical power sources for electric flight. Preferably, the electrical accumulators are ejectable, i. e. can be dropped, at least a predetermined part thereof, in case of an emergency in order to reduce a respective wing loading during emergency landing. Consequently, when dropping at least a predetermined part of the accumulators before an emergency landing, a risk of a crash can be reduced either by lowered wing(s) or reduced overall aircraft loading.

According to a preferred embodiment, the air duct is cylindrical and comprises a front side duct wall, a board side duct wall, a rear side duct wall, and a star board side duct wall. At least the front side duct wall and the board side and star board side duct walls exhibit different heights in axial direction of the air duct, wherein the different heights define an undulated geometry.

According to a further preferred embodiment, the height of the board side and star board side duct walls is greater than the height of the front side duct wall, which is greater than a height of the rear side duct wall.

According to a further preferred embodiment, the front side duct wall is connected to the board side duct wall and the star board side duct wall by means of an aerodynamically shaped transition.

According to a further preferred embodiment, the at least one wing is provided with an aerodynamic profile, wherein a front section of the at least one wing that is located with respect to a forward flight direction of the multirotor aircraft upstream of the air duct is provided with a first different aerodynamic profile.

According to a further preferred embodiment, the first different aerodynamic profile is shaped in spanwise direction of the at least one wing such as to create in sections different angles of attack of an inflow air stream flowing into the air duct in operation.

According to a further preferred embodiment, a rear section of the at least one wing that is located with respect to the forward flight direction of the multirotor aircraft downstream of the air duct is provided with a second different aerodynamic profile.

According to a further preferred embodiment, the air outlet region is provided in circumferential direction of the air duct at least partly with a sharp corner.

According to a further preferred embodiment, the sharp corner is implemented by a simple cut edge.

According to a further preferred embodiment, the sharp corner is implemented by a Gurney flap or a covered Gurney flap.

According to a further preferred embodiment, stator blades are arranged inside of the air duct, the stator blades being configured to redirect at least a portion of an inflow air stream in a predefined direction.

According to a further preferred embodiment, at least one vortex generator is provided adjacent to the air duct for redirecting at least a portion of an inflow air stream in a predefined direction.

According to a further preferred embodiment, the at least one wing comprises a board side half wing and a star board side half wing that are mounted to the airframe, the board side half wing being provided with at least two thrust producing units that are arranged in spanwise direction of the board side half wing, and the star board side half wing being provided with at least two thrust producing units that are arranged in spanwise direction of the star board side half wing.

According to a further preferred embodiment, at least one front wing and at least one rear wing are mounted to the airframe, wherein the at least one front wing is provided with at least four thrust producing units for producing thrust in a predetermined direction, the at least four thrust producing units of the at least one front wing being arranged in spanwise direction of the at least one front wing, and wherein the at least one rear wing is provided with at least four thrust producing units for producing thrust in a predetermined direction, the at least four thrust producing units of the at least one rear wing being arranged in spanwise direction of the at least one rear wing.

According to a further preferred embodiment, at least one additional thrust producing unit is provided for producing thrust in longitudinal direction of the multirotor aircraft in operation, the at least one additional thrust producing unit being preferably accommodated in a wing-independent shrouding.

According to one aspect, the inventive multirotor aircraft and, more specifically, the wing(s), which may be provided with associated winglets, and the air ducts arranged in the wing(s), may be embodied with suitable control surfaces to allow a controlled flight of the inventive multirotor aircraft similar to the flight of a conventional airplane only by means of the at least one additional thrust producing unit, but without the help of the thrust producing units that are arranged in the wing(s). Thus, advantageously safety in case of system failures of the thrust producing units that are arranged in the wing(s) can be guaranteed. Preferably, the wing(s), which may be provided with the associated winglets, and the air ducts arranged in the wing(s), are further embodied to allow also a controlled flight of the inventive multirotor aircraft in case of a failure of all thrust producing units similar to the flight of a glider resp. sailplane.

A further fail-safe feature can be provided by separating, i. e. segregating energy supply of the at least one additional thrust producing unit and the thrust producing units that are arranged in the wing(s) such that all of these thrust producing units define two different thrust producing unit systems which are independent from each other. Thus, a failure in one of the two systems does not affect the other system.

Moreover, according to one aspect a controlled flight in helicopter mode only by means of the thrust producing units that are arranged in the wing(s), i. e. without the at least one additional thrust producing unit, is advantageously enabled. Even in this case, a suitable control program that is embodied for controlling vertical flight/hover of the inventive multirotor aircraft is preferably configured such that failure of a subset of the thrust producing units that are arranged in the wing(s) does not affect the flight in the helicopter mode.

It should be noted that although the inventive multirotor aircraft is described hereinafter with reference to a multirotor structure with multiple rotor assemblies, it could likewise be implemented as a multipropeller structure with multiple propeller assemblies or as a multipropeller and -rotor structure. More specifically, while rotors are generally fully articulated, propellers are generally not articulated at all. However, both can be used for generating thrust and, thus, for implementing the thrust producing units according to the present invention. Consequently, any reference to rotors, rotor assemblies or rotor structures in the present description should likewise be understood as a reference to propellers, propeller assemblies or propeller structures, so that the inventive multirotor aircraft can likewise be implemented as a multipropeller and/or multipropeller and -rotor aircraft.

Preferably, the inventive multirotor aircraft is designed for transportation of passengers and is, in particular, suitable and adapted for being certificated for operation within urban areas. However, the inventive multirotor aircraft is nevertheless not limited to transport of passengers and may alternatively be used e. g. for transport of products and goods and so on. It is preferably easy to fly, has multiple redundancies, meets the safety demands of the authorities, is cost efficient in design and only creates comparatively low noise. Preferably, the inventive multirotor aircraft has a comparatively small rotor diameter with a light weight design and a fixed angle of incidence, and is nevertheless adapted for fulfilment of an emergency landing, although these rotor characteristics lead to a comparatively low inertia and a non-adjustable torque in operation.

According to one aspect, the inventive multirotor aircraft is capable of hovering and comprises a distributed propulsion system. It may optionally be designed with autorotation capability which is, however, not mandatory as it may preferably be capable of flying like a glider resp. sailplane in order to meet authority regulations, such as e.g. FAR and EASA regulations, regarding safety failure modes that amount up to approximately $1*10^{-9}$ failures per flight hour for the entire multirotor aircraft. In the aeronautical sector, these safety levels are typically defined by the so-called Design Assurance Levels (DAL) A to D.

Preferably, the inventive multirotor aircraft fulfils the authorities' regulation safety level needed to transport passengers. This is preferentially achieved by a combination and correlation of:

one or more individual rotor assemblies per thrust producing unit,
a redundant, segregated battery layout,
a redundant power supply and harness layout,
a physical separation and segregation of an underlying power management,
redundant, segregated electrical engines, and
pitch control and/or RPM control of the rotor assemblies.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
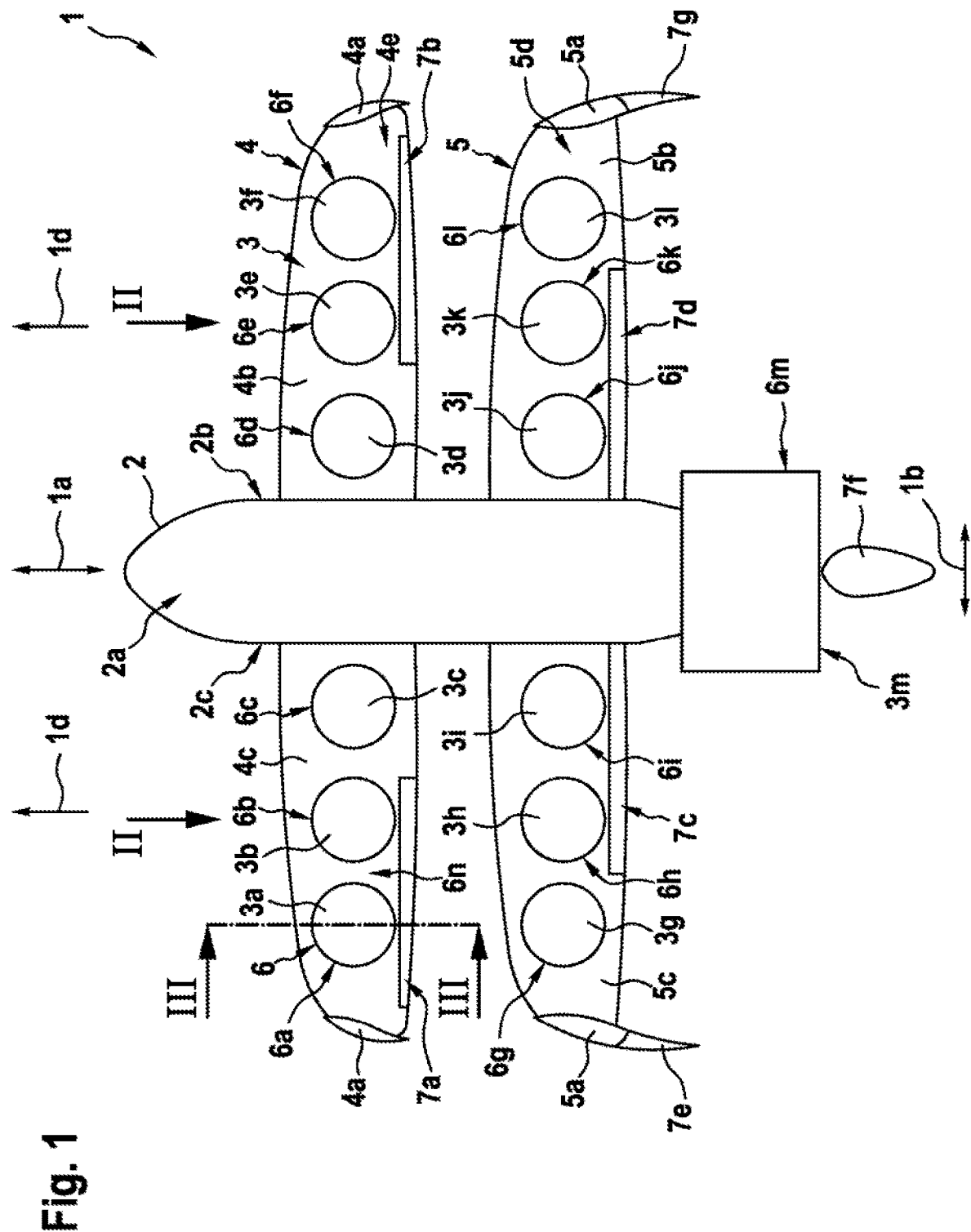
FIG. 1 shows a top view of a multirotor aircraft in wing-configuration with a predetermined number of thrust producing units according to one aspect.

FIG. 1 shows a multirotor aircraft 1 with an aircraft airframe 2 according to the present invention. The airframe 2 defines a supporting structure of the multirotor aircraft 1 and illustratively has a board side 2b and a star board side 2c.

The airframe 2 has an extension in longitudinal direction 1a, an extension in lateral direction 1b as well as an extension in vertical direction (1c in FIG. 2) and preferably defines an internal volume 2a. According to one aspect, the internal volume 2a is at least adapted for transportation of passengers, so that the multirotor aircraft 1 as a whole is adapted for transportation of passengers. Alternatively, or in addition, the internal volume 2a may be adapted for transportation of products and goods. The internal volume 2a is preferably further adapted for accommodating operational and electrical equipment, such as e. g. an energy storage system that is required for operation of the multirotor aircraft 1. More specifically, the internal volume 2a is preferably adapted for accommodating electrical accumulators as electrical power sources for electrical flight.

It should be noted that exemplary configurations of the internal volume 2a that are suitable for transportation of passengers, but also for accommodation of operational and electrical equipment, are readily available to the person skilled in the art and generally implemented to comply with applicable authority regulations and certification requirements regarding passenger transportation. Thus, as these configurations of the internal volume 2a of the multirotor aircraft 1 as such are not part of the present invention, they are not described in detail for brevity and conciseness.

According to one aspect, the multirotor aircraft 1 is embodied for vertical take-off and landing, hovering as well as flying in a forward flight direction 1d, but also in a rearward flight direction that is opposed to the forward flight direction 1d. Therefore, the multirotor aircraft 1 comprises a predetermined number of thrust producing units 3. Preferably, the predetermined number of thrust producing units 3 comprises at least four, preferentially at least five and, illustratively, thirteen thrust producing units 3a, 3b, 3c, 3d, 3e, 3f, 3g, 3h, 3i, 3j, 3k, 3l, 3m. The thrust producing units 3a, 3b, 3c, 3d, 3e, 3f, 3g, 3h, 3i, 3j, 3k, 3l, 3m are embodied for producing thrust in a predetermined direction in operation, such that the multirotor aircraft 1 is able to take-off and fly as described above.

Figure 2:
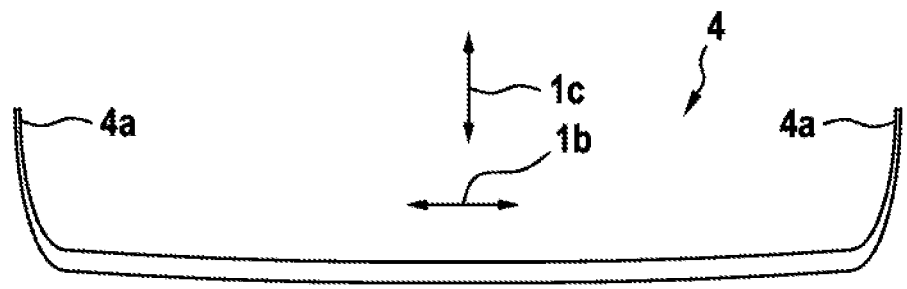
FIG. 2 shows a front view of a wing of the multirotor aircraft of FIG. 1, seen in direction II of FIG. 1.

Preferably, the thrust producing units 3a, 3b, 3c, 3d, 3e, 3f, 3g, 3h, 3i, 3j, 3k, 3l are provided for producing thrust at least approximately in the vertical direction (1c in FIG. 2). In contrast, the thrust producing unit 3m is provided for producing thrust at least approximately in the longitudinal direction 1a. According to a variant, instead of providing only the single thrust producing unit 3m, two or more thrust producing units for producing thrust at least approximately in the longitudinal direction 1a can be provided.

More specifically, the thrust producing units 3a, 3b, 3c, 3d, 3e, 3f, 3g, 3h, 3i, 3j, 3k, 3l are preferably at least provided for enabling vertical take-off and landing, as well as hovering of the multirotor aircraft 1. According to one aspect, the thrust producing units 3a, 3b, 3c, 3d, 3e, 3f, 3g, 3h, 3i, 3j, 3k, 3l are further provided to enable forward or rearward flight of the multirotor aircraft 1. In other words, the thrust producing units 3a, 3b, 3c, 3d, 3e, 3f, 3g, 3h, 3i, 3j, 3k, 3l are preferably provided for enabling operation of the multirotor aircraft 1 in a so-called helicopter mode, i. e. similar to operation of a conventional helicopter. Preferentially, a suitable control program for controlling operation of the multirotor aircraft 1 in the helicopter mode is provided and configured such that failure of a subset of the thrust producing units 3a, 3b, 3c, 3d, 3e, 3f, 3g, 3h, 3i, 3j, 3k, 3l in the helicopter mode does not affect operation of the multirotor aircraft 1.

The thrust producing unit 3m is preferably provided for enabling operation of the multirotor aircraft 1 in a so-called airplane mode, i. e. similar to operation of a conventional airplane. In order to allow operation in the airplane mode, the multirotor aircraft 1 preferably comprises at least one and, preferentially, at least two wings 4, 5. The wings 4, 5 are mounted to the airframe 2, such that the wing 4 illustratively defines a front wing, while the wing 5 illustratively defines a rear wing. Preferentially, the front and rear wings 4, 5 are optimized to gain lift in upward direction.

The front wing 4 is preferably equipped with optional winglets 4a and divided into a board side front half wing 4b and a star board side front half wing 4c. Similarly, the rear wing 5 is preferably equipped with optional winglets 5a and divided into a board side rear half wing 5b and a star board side rear half wing 5c. Alternatively, or additionally, the front wing 4 and the rear wing 5 may be provided with lateral extensions.

According to one aspect, the front and rear wings 4, 5 and, more generally, the multirotor aircraft 1 as such is equipped with suitable control surfaces 7 to allow a controlled flight of the multirotor aircraft 1 in the airplane mode only by means of the thrust producing unit 3m, but without the help of the thrust producing units 3a, 3b, 3c, 3d, 3e, 3f, 3g, 3h, 3i, 3j, 3k, 3l. More specifically, the front wing 4 is preferably provided with ailerons 7a, 7b for changing roll, the rear wing 5 is preferably provided with elevators 7c, 7d for changing pitch, and rudders 7e, 7f, 7g are provided for changing yaw. Furthermore, the function of aileron and pitch changing can be exchanged between front and rear wing or these functions can be combined. Moreover, the front wing 4 is preferably embodied with a suitable aerodynamic profile 4e and the rear wing 5 is preferably embodied with a suitable aerodynamic profile 5d. Preferentially, the front and rear wings 4, 5, the optional winglets 4a, 5a, the aerodynamic profiles 4e, 5d, and the control surfaces 7 are further embodied to allow also a controlled flight of the multirotor aircraft 1 similar to the flight of a glider resp. sailplane in the airplane mode, i. e. without use of any one of the thrust producing units 3a, 3b, 3c, 3d, 3e, 3f, 3g, 3h, 3i, 3j, 3k, 3l, 3m.

It should be noted that suitable control surfaces as such that can be used for implementing the control surfaces 7, as well as suitable aerodynamic profiles as such that can be used for implementing the aerodynamic profiles 4e, 5d, are well-known to the person skilled in the art and not part of the present invention. Therefore, a more detailed description of the control surfaces 7 and the aerodynamic profiles 4e, 5d is omitted for brevity and conciseness. Furthermore, suitable modifications and combinations resp. possible omissions of subsets of the control surfaces 7 are readily available to the person skilled in the art and, therefore, likewise contemplated. Alternatively, or in addition, control of the multirotor aircraft 1 can be performed by different operating speeds of selected ones of the thrust producing units 3a, 3b, 3c, 3d, 3e, 3f, 3g, 3h, 3i, 3j, 3k, 3l, 3m or with a combination of aerodynamic control surfaces and different operating speeds.

It should further be noted that the front and rear wings 4, 5 may in addition, or alternatively, have vertical planes at each lateral end, similar to the winglets 4a, 5a, to enlarge a respective aerodynamic extension of the front and rear wings 4, 5 without increasing the so-called foot print of the multirotor aircraft 1, i. e. its projected area. If these vertical planes are fixed to the rear wing 5, their function would also be to stabilize the multirotor aircraft 1 and may further be, e. g. in combination with flaps positioned at these vertical planes, to control a respective vertical axis of the multirotor aircraft 1, thus, operating like a fin tail. However, neither all vertical planes must have the same extension or the same amount of ducts and thrust producing units. Thus, various different configurations are contemplated, such as e. g. a canard wing configuration, a tandem wing configuration, a standard wing configuration, a canard wing with standard wing configuration etc. However, the illustrated and described tandem wing configuration is preferred.

The thrust producing units 3a, 3b, 3c, 3d, 3e, 3f, 3g, 3h, 3i, 3j, 3k, 3l are preferably arranged in spanwise direction of the front and rear wings 4, 5. More specifically, the thrust producing units 3a, 3b, 3c are preferably arranged and aligned in spanwise direction in the star board side front half wing 4c, the thrust producing units 3d, 3e, 3f are preferably arranged and aligned in spanwise direction in the board side front half wing 4b, the thrust producing units 3g, 3h, 3i are preferably arranged and aligned in spanwise direction in the star board side rear half wing 5c, and the thrust producing units 3j, 3k, 3l are preferably arranged and aligned in spanwise direction in the board side front half wing 5b.

According to one aspect, at least one and, preferentially, each one of the thrust producing units 3a, 3b, 3c, 3d, 3e, 3f, 3g, 3h, 3i, 3j, 3k, 3l, 3m comprises an associated shrouding in order to improve underlying aerodynamics and to increase operational safety. By way of example, a plurality of shrouding units 6 is shown with thirteen separate shroudings 6a, 6b, 6c, 6d, 6e, 6f, 6g, 6h, 6i, 6j, 6k, 6l, 6m. Illustratively, the shrouding 6a is associated with the thrust producing unit 3a, the shrouding 6b with the thrust producing unit 3b, the shrouding 6c with the thrust producing unit 3c, the shrouding 6d with the thrust producing unit 3d and so on.

The shroudings 6a, 6b, 6c, 6d, 6e, 6f, 6g, 6h, 6i, 6j, 6k, 6l, 6m can be made of a simple sheet metal and/or have a complex geometry. Preferably, the shroudings 6a, 6b, 6c, 6d, 6e, 6f, 6g, 6h, 6i, 6j, 6k, 6l are integrated into the rear and front wings 4, 5, and the shrouding 6m is implemented as a wing-independent shrouding. More specifically, the shroudings 6a, 6b, 6c are preferably integrated into the star board side front half wing 4c, the shroudings 6d, 6e, 6f are preferably integrated into the board side front half wing 4b, the shroudings 6g, 6h, 6i are preferably integrated into the star board side rear half wing 5c, and the shroudings 6j, 6k, 6l are preferably integrated into the board side front half wing 5b.

Preferably, the wing-independent shrouding 6m has a greater longitudinal extension in airflow direction than any one of the shroudings 6a, 6b, 6c, 6d, 6e, 6f, 6g, 6h, 6i, 6j, 6k, 6l. Preferentially, the wing-independent shrouding 6m is configured such that it contributes to stabilizing the multirotor aircraft 1 around its vertical axis and lateral axis and, accordingly, also has partially a part of a function of a horizontal and vertical stabilizer.

According to one aspect, the shroudings 6a, 6b, 6c, 6d, 6e, 6f, 6g, 6h, 6i, 6j, 6k, 6l, 6m in the front and rear wings 4, 5 are respectively separated by associated interspaces. Illustratively, only the interspace between the shroudings 6a, 6b is labeled with the reference sign 6n for simplicity and clarity of the drawings.

FIG. 2 shows the front wing 4 of FIG. 1 with the winglets 4a, for illustrating implementation of the winglets 4a in vertical direction 1c of the airframe 2 of the multirotor aircraft 1 of FIG. 1. In contrast to FIG. 1, the front wing 4 is now illustrated as a single, one piece wing. However, the front wing 4 may likewise be implemented as illustrated in FIG. 1, i. e. as being divided into the board side front half wing 4b and the star board side front half wing 4c of FIG. 1, both of which are laterally mounted to the airframe 2 of the multirotor aircraft 1 of FIG. 1.

The front wing 4 may have a sweep angle of up to +/−30°. The front wing 4 may further have an angle of −5 to +20° with respect to the lateral axis, i. e. in the lateral direction 1b of FIG. 1. If this angle is sufficiently great, a change of direction of the multirotor aircraft 1 of FIG. 1 is possible without roll-ailerons, i. e. the ailerons 7a, 7b of FIG. 1, and can be controlled only with a yaw rudder, i. e. the rudders 7e, 7f, 7g of FIG. 1. However, the multirotor aircraft 1 is preferably also stable along the longitudinal axis, i. e. in the longitudinal direction 1a of FIG. 1. Thus, complexity can be reduced in case of failure of the thrust producing units 3a, 3b, 3c, 3d, 3e, 3f, 3g, 3h, 3i, 3j, 3k, 3l in the airplane mode. For the same purpose, a respective outside end of the front wing 4 can be bended upward up to 80° and can additionally be combined with the optional winglets 4a.

It should be noted that the front wing 4 has only been described in more detail in a representative manner. In other words, the described configuration of the front wing 4 may similarly be applied to the rear wing 5.

Figure 3:
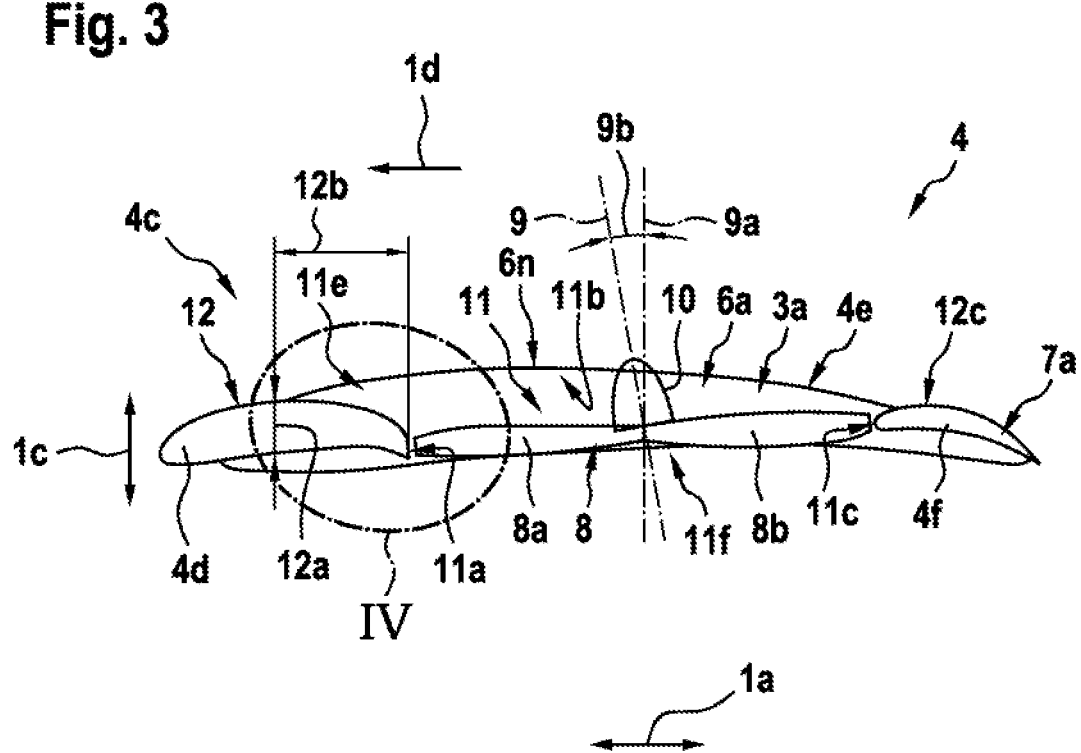
FIG. 3 shows a sectional view of the wing of FIG. 1 and FIG. 2 with one thrust producing unit, seen along a cut line III-III in FIG. 1.

FIG. 3 shows the thrust producing unit 3a of FIG. 1, which is arranged in the front wing 4 of FIG. 1 that has the aerodynamic profile 4e and, more specifically, in the star board side front half wing 4c of FIG. 1. However, it should be noted that the thrust producing unit 3a is only shown and described in greater detail representative for all other thrust producing units 3b, 3c, 3d, 3e, 3f, 3g, 3h, 3i, 3j, 3k, 3l of FIG. 1. Only the thrust producing unit 3m with its wing-independent shrouding 6m can be embodied in a conventional manner that is well-known to the person skilled in the art and, therefore, not described in more detail, for brevity and conciseness.

The thrust producing unit 3a preferably comprises the shrouding 6a that is integrated into the star board side front half wing 4c, as described above. According to one aspect, the thrust producing unit 3a further comprises at least one rotor assembly 8 that is accommodated in the shrouding 6a.

The at least one rotor assembly 8 is preferably equipped with at least two and, exemplarily, with exactly two rotor blades 8a, 8b. In other words, the number of rotor blades is scalable in an application-specific manner, so that more than the two rotor blades 8a, 8b may be provided. Preferentially, the at least one rotor assembly 8 has a rotation axis 9 that is preferably inclined by a respective inclination angle 9b relative to a transversal axis 9a defined by the star board side front half wing 4c. Thus, the at least one rotor assembly 8 preferably defines a rotational plane that is at least mainly horizontally oriented.

The respective inclination angle 9b is preferably comprised in a range from 1° to 20°. Thus, the at least one rotor assembly 8 is arranged to improve a glide ratio of the multirotor aircraft 1 of FIG. 1 in the airplane mode.

By way of example, the at least one rotor assembly 8 comprises a gearbox fairing 10 that is also arranged inside of the shrouding 6a. However, it should be noted that the gearbox fairing 10 is only shown by way of example and not for limiting the invention accordingly. Instead, the thrust producing unit 3a may e. g. directly be equipped with an electrical motor arranged in the shrouding 6a.

According to one aspect, the shrouding 6a defines an air duct 11. More specifically, the air duct 11 is preferably cylindrical and comprises a front side duct wall 11a, a board side duct wall 11b, a rear side duct wall 11c, and a star board side duct wall (11d in FIG. 8), which delimit the air duct 11 in radial direction. The front side duct wall 11a is diametrically opposed to the rear side duct wall 11c, and the board side duct wall 11b is diametrically opposed to the star board side duct wall (11d in FIG. 8).

In axial direction, the air duct 11 is delimited by an air inlet region 11e and an air outlet region 11f. The air inlet region 11e preferably exhibits in circumferential direction of the air duct 11 an undulated geometry. More specifically, at least the front side duct wall 11a and the board side and star board side duct walls 11b(and 11d in FIG. 8) preferably exhibit different heights in axial direction of the air duct 11, wherein the different heights define the undulated geometry. By way of example, the height of the board side and star board side duct walls 11b(and 11d in FIG. 8) is greater than the height of the front side duct wall 11a, which is greater than a height of the rear side duct wall 11c.

More specifically, the front side duct wall 11a is preferably implemented as a cylindrical part where a minimum height is located at least approximately at a central portion thereof, with a possible deviation of +/−30°. This minimum height preferably amounts maximally to 30% of a respective diameter of the at least one rotor assembly 8. Preferably, the height of the cylindrical part of the front side duct wall 11a is increased towards the board side and star board side duct walls 11b(and 11d in FIG. 8) in the vertical direction 1c of FIG. 2.

Preferably, the front side duct wall 11a is connected to the board side duct wall 11b and the star board side duct wall (11d in FIG. 8) by means of an aerodynamically shaped transition. In other words, the front side duct wall 11a is connected to the board side duct wall 11b and the star board side duct wall (11d in FIG. 8) by means of a smooth transition with an associated radius, but without any sharp corners, edges, kinks, shoulders and/or steps. Preferably, the board side duct wall 11b and the star board side duct wall (11d in FIG. 8) are implemented by cutting off respective portions of the star board side front half wing 4c. In a top view, these cut-off portions preferentially respectively define a part of a circle building a part of the air duct 11.

Illustratively, the front side duct wall 11a is formed by a front section 4d of the front wing 4, resp. the star board side front half wing 4c. Similarly, the rear side duct wall 11c is illustratively formed by a rear section 4f of the front wing 4, resp. the star board side front half wing 4c. The board side duct wall 11b is illustratively formed by the shroudings interspace 6n of the front wing 4, resp. the star board side front half wing 4c. This likewise applies to the star board side duct wall (11d in FIG. 8).

According to one aspect, the front section 4d of the front wing 4, resp. the star board side front half wing 4c, is located with respect to the forward flight direction 1d of FIG. 1 of the multirotor aircraft 1 of FIG. 1 upstream of the air duct 11 and provided with a first aerodynamic profile 12 that differs from the aerodynamic profile 4e of the front wing 4.

The first aerodynamic profile 12 is preferably embodied for providing upward lift to the front section 4d. According to one aspect, the air duct 11 starts a predetermined length 12b behind a respective highest thickness of the first aerodynamic profile 12. Illustratively, the respective highest thickness is indicated, by way of example, with an arrow 12a. The predetermined length 12b preferably amounts to at least 10% of an overall length of the first aerodynamic profile 12 in its longitudinal direction, which illustratively corresponds to the longitudinal direction 1a of the airframe 2 of FIG. 1. Preferentially, the predetermined length 12b is selected in a range from 40% to 80% of the overall length of the first aerodynamic profile 12 in its longitudinal direction. Illustratively, but not necessarily and not for restricting the present invention thereto, the predetermined length 12b amounts to approximately 66% of the first aerodynamic profile 12.

According to one aspect, the rear section 4f of the front wing 4, resp. the star board side front half wing 4c, is located with respect to the forward flight direction 1d downstream of the air duct 11 and preferably provided with a second aerodynamic profile 12c. This second aerodynamic profile 12c preferably differs from the aerodynamic profile 4e of the front wing 4 and, preferentially, also differs from the first aerodynamic profile 12.

More specifically, at the rear part of the air duct 11, the air duct 11 is preferably part of a leading edge of the aerodynamic profile 12c located at the rear side duct wall 11c. A minimum height of the rear side duct wall 11c and, preferably, of the entire air duct 11, is preferably located at least approximately at a central position of the rear side duct wall 11c, with a possible deviation of +/−30%. The minimum height of the rear side duct wall 11c is preferably smaller or equal to the minimum height of the front side duct wall 11a. According to one aspect, the minimum height of the rear side duct wall 11c can be zero, so that the second aerodynamic profile 12c is not influenced by the air duct 11 and may be provided with a normal profile radius. In other words, the rear side duct wall 11c may advantageously be flattened in lateral direction.

It should be noted that the board side duct wall 11b and the star board side duct wall (11d in FIG. 8) are preferably provided with the aerodynamic profile 4e of the front wing 4. This aerodynamic profile 4e preferentially comprises a greater longitudinal extension than the first and second aerodynamic profiles 12, 12c.

In summary, the height of the air duct 11 is preferably designed as small as possible, in order not to affect the effectivity of the aerodynamic profile 4d as main lifting wing. Furthermore, the air inlet region 11e of the air duct 11 exhibits in circumferential direction of the air duct 11 according to one aspect at least two different aerodynamic profiles and, illustratively, three aerodynamic profiles, i. e. the aerodynamic profiles 4e, 12, 12c.

According to one aspect, during hovering of the multirotor aircraft 1 of FIG. 1 all thrust producing units 3a, 3b, 3c, 3d, 3e, 3f, 3g, 3h, 3i, 3j, 3k, 3l are controlled by controlling the RPM of the respective rotor assemblies, e. g. with an electronic state of the art device, for stabile flight. In case of failure of these rotor assemblies, the aerodynamic design of the multirotor aircraft together with an underlying mass distribution should allow an airplane like stabile flight in the airplane mode. However, all rotor assemblies preferably exhibit a predetermined inclination angle to the vertical axis for a favorable airflow and stability. Likewise, also the thrust producing unit 3m may exhibit a predefined inclination with respect to the longitudinal direction 1a of FIG. 1. Finally, any accumulators for electrically powering the rotor assemblies, or at least some of these accumulators, may be dropped in case of an emergency landing. Thus, less energy has to be absorbed in case of a crash.

Figure 4:
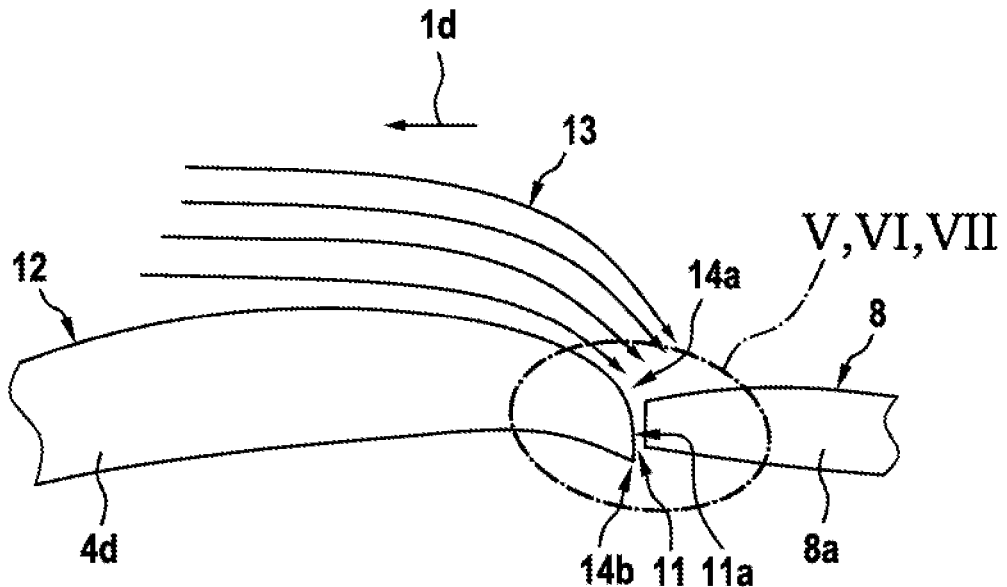
FIG. 4 shows an enlarged detail IV of FIG. 3.

FIG. 4 shows the rotor assembly 8 with the rotor blade 8a of FIG. 3, as well as the front section 4d of the front wing 4, resp. the star board side front half wing 4c, of FIG. 3, which is provided with the first aerodynamic profile 12 of FIG. 3. FIG. 4 illustrates the front side duct wall 11a of the air duct 11 of FIG. 3 in more detail.

More specifically, an inflow air stream 13 that flows during forward flight and hover of the multirotor aircraft 1 of FIG. 1 in the forward flight direction 1d of FIG. 1 along the first aerodynamic profile 12 towards the rotor assembly 8 is illustrated. This inflow air stream 13 is redirected towards the rotor assembly 8 by means of a rounded edge 14a that is preferably provided at least at a rear part of the front section 4d. More specifically, the rounded edge 14a is arranged with respect to the inflow air stream 13 at a location upstream of the rotor assembly 8, i. e. at the air inlet region 11e of FIG. 3.

However, in contrast to this rounded edge 14a that is arranged upstream of the rotor assembly 8, preferably a sharp corner 14b is provided at the rear part of the front section 4d and arranged with respect to the inflow air stream 13 at a location downstream of the rotor assembly 8. In other words, the sharp corner 14b is preferably arranged at the air outlet region 11f of FIG. 3. With such a design, the air duct 11 can be elongated easily and the lift of the front section 4d can be increased. More generally, according to one aspect the first aerodynamic profile 12 is shaped in spanwise direction of the front wing 4 of FIG. 3 such as to create in sections different angles of attack of the inflow air stream 13 flowing into the air duct 11 in operation.

Figure 5:
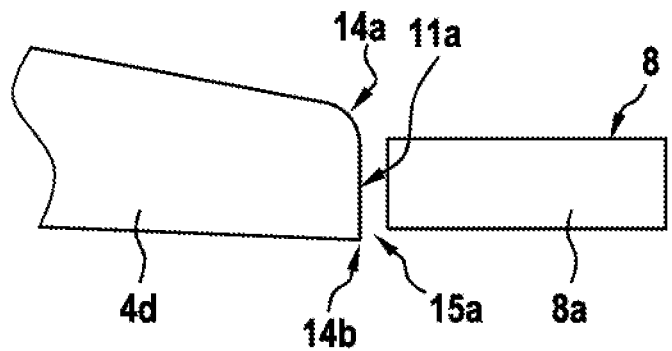
FIG. 5 shows the enlarged detail of FIG. 4 according to a first variant.

FIG. 5 shows the rotor assembly 8 with the rotor blade 8a of FIG. 4, as well as the front section 4d of FIG. 4 of the front wing 4, resp. the star board side front half wing 4c, of FIG. 3. According to FIG. 4, the front section 4d is provided with the rounded edge 14a and the sharp corner 14b. However, in contrast to FIG. 4, the sharp corner 14b is now implemented by a simple cut edge 15a.

Figure 6:
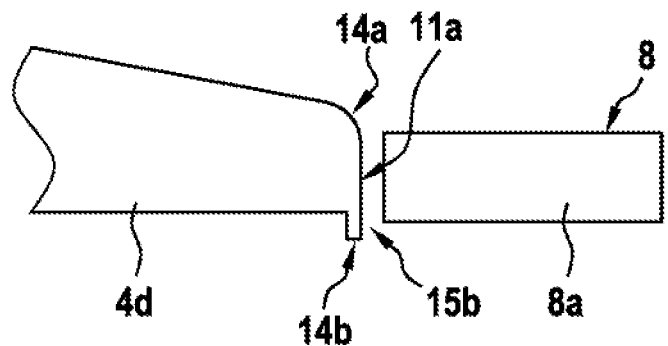
FIG. 6 shows the enlarged detail of FIG. 4 according to a second variant.

FIG. 6 shows the rotor assembly 8 with the rotor blade 8a of FIG. 4, as well as the front section 4d of FIG. 4 of the front wing 4, resp. the star board side front half wing 4c, of FIG. 3. According to FIG. 4, the front section 4d is provided with the rounded edge 14a and the sharp corner 14b. However, in contrast to FIG. 4, the sharp corner 14b is now implemented by a so-called Gurney flap 15b. With such a design, the air duct 11 can be elongated easily and the lift of the front section 4d can be increased.

Figure 7:
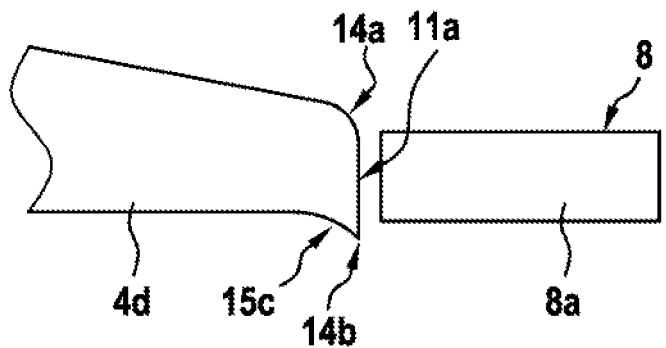
FIG. 7 shows the enlarged detail of FIG. 4 according to a third variant.

FIG. 7 shows the rotor assembly 8 with the rotor blade 8a of FIG. 4, as well as the front section 4d of FIG. 4 of the front wing 4, resp. the star board side front half wing 4c, of FIG. 3. According to FIG. 4, the front section 4d is provided with the rounded edge 14a and the sharp corner 14b. However, in contrast to FIG. 4, the sharp corner 14b is now implemented by a covered Gurney flap 15c.

Figure 8:
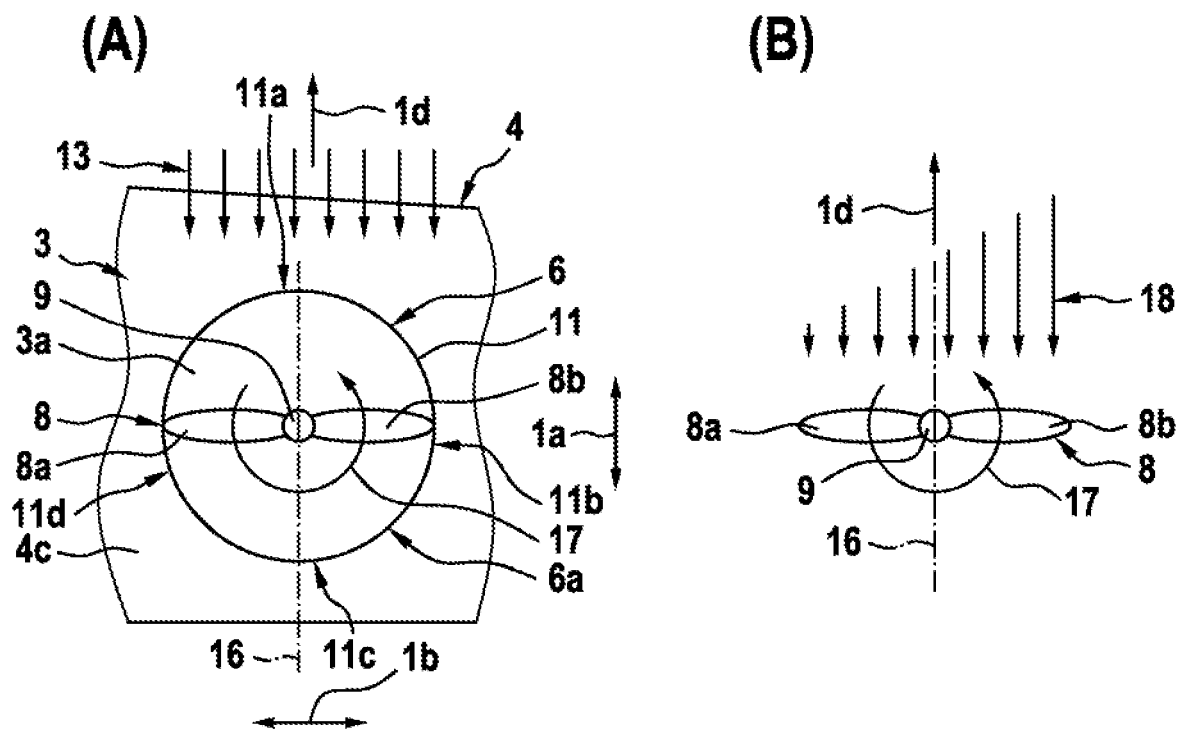
FIG. 8 shows top views of the thrust producing unit of FIG. 3 with a real air flow in forward flight at the thrust producing unit.

FIG. 8 shows in a part (A) a portion of the front wing 4, resp. the star board side front half wing 4c, of FIG. 3 with the rotor assembly 8 having the rotor blades 8a, 8b of FIG. 3. The rotor assembly 8 is arranged inside of the shrouding 6a of FIG. 3 that defines the air duct 11 of FIG. 3. According to FIG. 3, the latter comprises the front side duct wall 11a, the board side duct wall 11b, the rear side duct wall 11c, and a star board side duct wall 11d. Illustratively, the air duct 11 exhibits an axis of symmetry 16. The rotor assembly 8 is preferably configured such that the rotor blades 8a, 8b rotate around the inclined rotation axis 9 of FIG. 3 into a rotation direction 17.

More specifically, part (A) illustrates the inflow air stream 13 according to FIG. 4 that attacks the front wing 4 during forward flight of the multirotor aircraft 1 of FIG. 1 in the forward flight direction 1d of FIG. 1. Accordingly, with respect to the inflow air stream 13 and the rotation direction 17, the rotor blade 8a as illustrated represents a retreating rotor blade and the rotor blade 8b as illustrated represents an advancing rotor blade. Therefore, for clarity and simplicity, the rotor blade 8a is hereinafter referred to as the "retreating rotor blade 8a" and the rotor blade 8b is hereinafter referred to as the "advancing rotor blade 8b".

However, due to the rotation of the rotor blades 8a, 8b in the rotation direction 17 and a respectively generated forward flight speed of the multirotor aircraft 1 of FIG. 1, a real air flow 18 illustrated in part (B) is perceived at the rotor blades 8a, 8b. As can easily be recognized, a respective velocity of the real air flow 18 is significantly greater at the advancing rotor blade 8b, than at the retreating rotor blade 8a. In other words, the real air flow 18 is unevenly distributed at the rotor assembly 8.

It should be noted that such an uneven distribution of the velocity of the real air flow 18 at the rotor assembly 8 leads to a reduced efficiency of the rotor assembly 8 and to an unequal generation and distribution of lift, as the retreating rotor blade 8a clearly generates less lift than the advancing rotor blade 8b. To remedy this problem, the air duct 11 is preferably implemented asymmetrically with respect to its rotation axis, i. e. its longitudinal axis, as described above with reference to FIG. 3. However, in addition the real air flow 18 may be modified resp. influenced in forward flight and hover of the multirotor aircraft 1 of FIG. 1. The aim of such a modification resp. influence would be to obtain an at least approximately equalized lift distribution for more efficiency of the rotor assembly in forward flight, as well as an at least approximately equalized real air flow at the rotor assembly 8 for increasing efficiency of and reducing loads on the rotor assembly 8.

Figure 9:
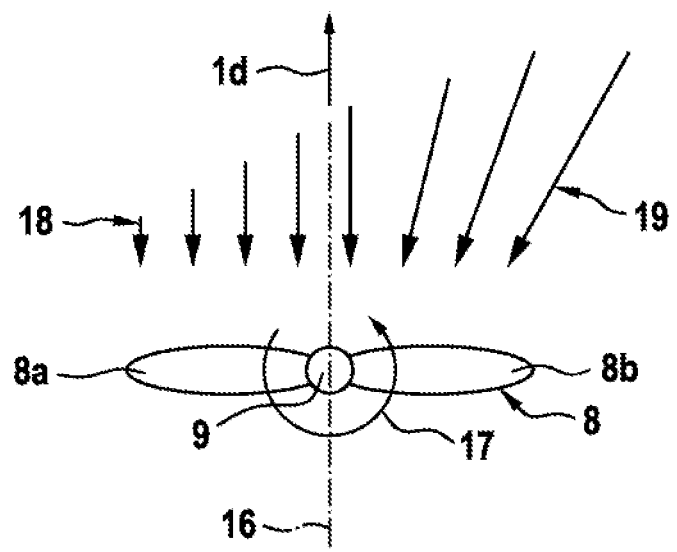
FIG. 9 shows a modified air flow in forward flight at the thrust producing unit of FIG. 8 according to a first variant.

FIG. 9 shows the rotor assembly 8 of FIG. 8, part (B), with the retreating rotor blade 8a and the advancing rotor blade 8b. More specifically, FIG. 9 illustrates a first variant of modifying resp. influencing the real air flow 18 at the rotor assembly 8 in forward flight and hover of the multirotor aircraft 1 of FIG. 1.

According to one aspect, an underlying direction of the real air flow 18 at the rotor assembly 8 is modified resp. influenced such that a redirected airflow 19 attacks at the advancing rotor blade 8b. The redirected airflow 19 preferably attacks the advancing rotor blade 8b such that lift generated by means of the advancing rotor blade 8b is decreased. Similarly, or in addition, the real air flow 18 at the retreating rotor blade 8a, which is exemplarily shown as being unmodified resp. uninfluenced, may be modified resp. influenced such that lift generated by means of the retreating rotor blade 8a is increased. Thus, distribution of generated lift can be equalized advantageously.

Figure 10:
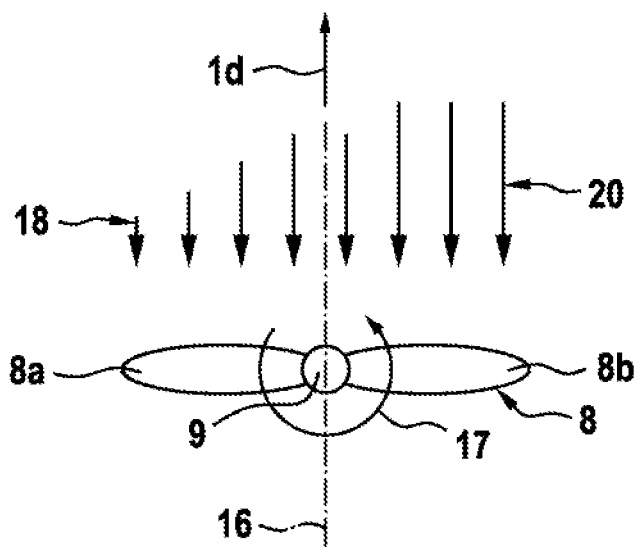
FIG. 10 shows the air flow in forward flight at the thrust producing unit of FIG. 8 according to a second variant.

FIG. 10 shows the rotor assembly 8 of FIG. 8, part (B), with the retreating rotor blade 8a and the advancing rotor blade 8b. More specifically, FIG. 10 illustrates a second variant of modifying resp. influencing the real air flow 18 at the rotor assembly 8 in forward flight and hover of the multirotor aircraft 1 of FIG. 1.

According to one aspect, an underlying air speed of the real air flow 18 at the rotor assembly 8 is modified resp. influenced such that an airflow 20 with reduced speed attacks at the advancing rotor blade 8b. The airflow 20 with reduced speed preferably attacks the advancing rotor blade 8b such that lift generated by means of the advancing rotor blade 8b is decreased. Thus, distribution of generated lift can be equalized advantageously.

Figure 11:
FIG. 11 shows a schematic view of a section through the retreating rotor blade with real and modified air flow according to a third variant.

FIG. 11 shows only a section of the retreating rotor blade 8a of the rotor assembly 8 of FIG. 8, part (B). More specifically, FIG. 11 illustrates a third variant of modifying resp. influencing the real air flow 18 at the rotor assembly 8 and, more specifically, at the retreating rotor blade 8a in forward flight and hover of the multirotor aircraft 1 of FIG. 1.

According to one aspect, the real air flow 18 is at least partly redirected such that an underlying angle of attack of the real air flow 18 at the retreating rotor blade 8a is modified resp. influenced. Accordingly, a redirected airflow 21 with an increased angle of attack at the retreating rotor blade 8a can be generated. The redirected airflow 21 with an increased angle of attack preferably attacks the retreating rotor blade 8a such that lift generated by means of the retreating rotor blade 8a is increased. Thus, distribution of generated lift can be equalized advantageously.

Figure 12:
FIG. 12 shows a schematic view of an advancing rotor blade with real and modified air flow according to a fourth variant.

FIG. 12 shows only the advancing rotor blade 8b of the rotor assembly 8 of FIG. 8, part (B). More specifically, FIG. 12 illustrates a fourth variant of modifying resp. influencing the real air flow 18 at the rotor assembly 8 and, more specifically, at the advancing rotor blade 8b in forward flight and hover of the multirotor aircraft 1 of FIG. 1.

According to one aspect, the real air flow 18 is at least partly redirected such that an underlying angle of attack of the real air flow 18 at the advancing rotor blade 8b is modified resp. influenced. Accordingly, a redirected airflow 22 with a decreased angle of attack at the advancing rotor blade 8b can be generated. The redirected airflow 22 with a decreased angle of attack preferably attacks the advancing rotor blade 8b such that lift generated by means of the advancing rotor blade 8b is decreased. Thus, distribution of generated lift can be equalized advantageously.

Figure 13:
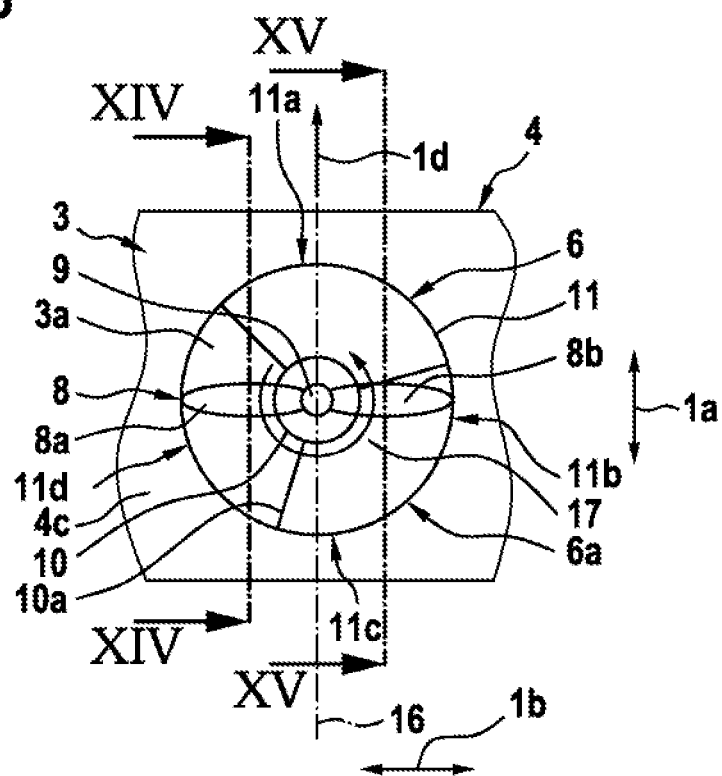
FIG. 13 shows a top view of the thrust producing unit of FIG. 3.

FIG. 13 shows a portion of the front wing 4, resp. the star board side front half wing 4c, of FIG. 3 with the rotor assembly 8 having the rotor blades 8a, 8b of FIG. 3. Furthermore, the gearbox fairing 10 of FIG. 3 is shown, which is preferably mounted to the shrouding 6a of FIG. 3 by means of suitable struts 10a. The struts 10a are arranged inside of the air duct 11 of FIG. 3 and preferably configured to redirect at least a portion of the real air flow 18 in a predefined direction.

More specifically, the gearbox fairing 10, resp. a given gearbox or engine positioned in the center of the shrouding 6a must be fixed with one or more struts 10a, which are also referred to as stator blades hereinafter. Preferable the struts 10a are designed with a profile that allows reduction of drag due to a respective air flow emanating from the rotor assembly 8 and/or from forward flight of the multirotor aircraft 1 of FIG. 1 in the forward flight direction 1d of FIG. 1.

Each one of the struts 10a may have a different angle of attack depending on its position and orientation. Furthermore, the struts 10a can be located upstream or downstream of the rotor assembly 8. According to one aspect, the struts 10a are used to influence an underlying angle of attack of the real air flow 18 according to FIG. 8, part (B) at the rotor blades 8a, 8b, as described hereinafter with reference to FIG. 14 and FIG. 15.

Figure 14:
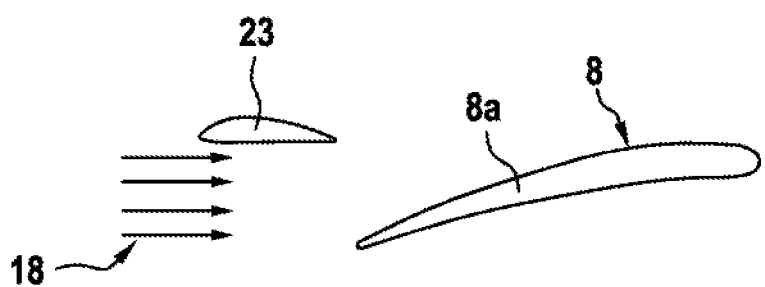
FIG. 14 shows a schematic view of a retreating rotor blade with real air flow, seen along a cut line XIV-XIV in FIG. 13.

FIG. 14 shows only the retreating rotor blade 8a of the rotor assembly 8 of FIG. 13 and a stator blade 23 of the struts 10a of FIG. 13. More generally, behind a strongly curved profile and/or with a high angle of attack at the stator blade, as e. g. provided for a stator blade 24 in FIG. 15, the real air flow 18 would be more downward oriented. This downward orientation is greater the more the profile of the stator blade is curved and as higher the angle of attack of this profile is. However, contrary to the advancing rotor blade of FIG. 13, the angle of attack of the retreating rotor blade 8a should preferably be increased to compensate an underlying lower airspeed of the real air flow 18. However, this would cause an upward airflow, which is unfavorable for a given complete lifting system.

It should be noted that the stator blade 23 is only optimized for low drag in forward flight and hover of the multirotor aircraft 1 of FIG. 1. In particular, the angle of attack of the stator blade 23 is reduced with respect to the real air flow 18.

Figure 15:
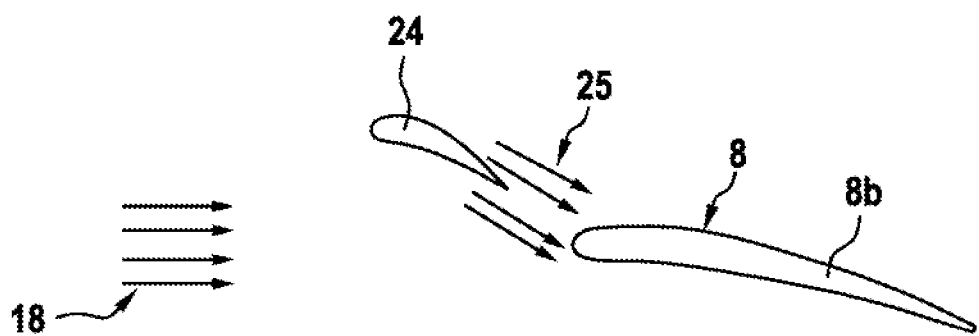
FIG. 15 shows a schematic view of an advancing rotor blade with real and redirected air flow, seen along a cut line XV-XV in FIG. 13.

FIG. 15 shows only the advancing rotor blade 8b of the rotor assembly 8 of FIG. 13 and a stator blade 24 of the struts 10a of FIG. 13. However, the stator blade 24 is designed in a different manner than the stator blade 23 of FIG. 14. More specifically, the stator blade 24 has a higher curvature and/or a higher angle of attack than the stator blade 23. Thus, an airflow 25 with a higher angle of attack compared to FIG. 14 is generated. Additionally, there can be two or three such stator blades 24.

Figure 16:
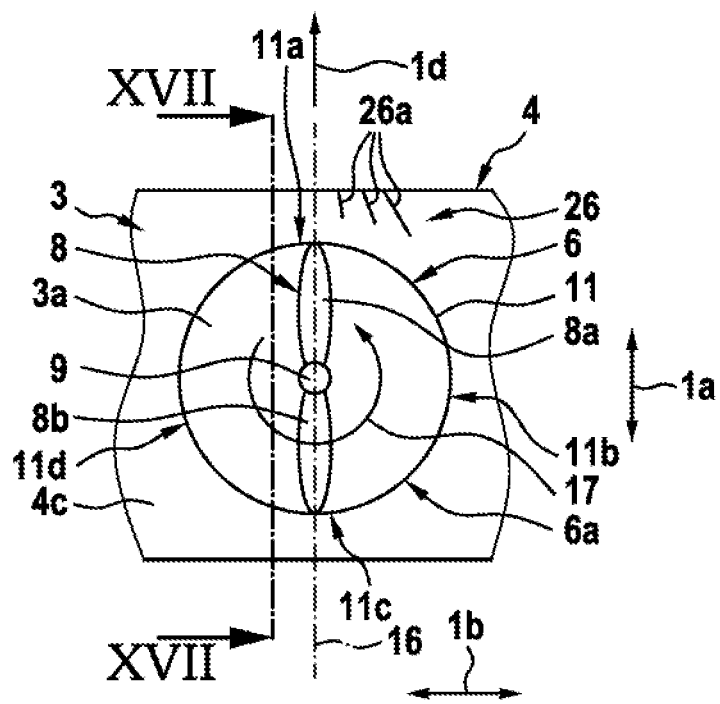
FIG. 16 shows a top view of the thrust producing unit and the wing of FIG. 3, with a vortex generator according to one aspect.

FIG. 16 shows a portion of the front wing 4, resp. the star board side front half wing 4c, of FIG. 3 with the rotor assembly 8 having the rotor blades 8a, 8b of FIG. 3. However, in contrast to FIG. 3, the front wing 4, resp. the star board side front half wing 4c, is now provided with a vortex generator 26. More specifically, the vortex generator 26 is provided for changing a respective direction of at least a portion of the inflow air stream 13 of FIG. 8, part (A) and, thus, to modify resp. influence the real air flow 18 of FIG. 8, part (B) at the rotor assembly 8.

According to one aspect, the vortex generator 26 is formed by at least one and, preferably, three vertical fins 26a arranged on the front wing 4, resp. the star board side front half wing 4c, which are adapted to redirect the inflow air stream 13 of FIG. 8, part (A) at the advancing rotor blade 8b in forward flight of the multirotor aircraft 1 of FIG. 1. Thus, lift generated by means of the advancing rotor blade 8b is decreased and, accordingly, the distribution of generated lift can be equalized advantageously.

Figure 17:
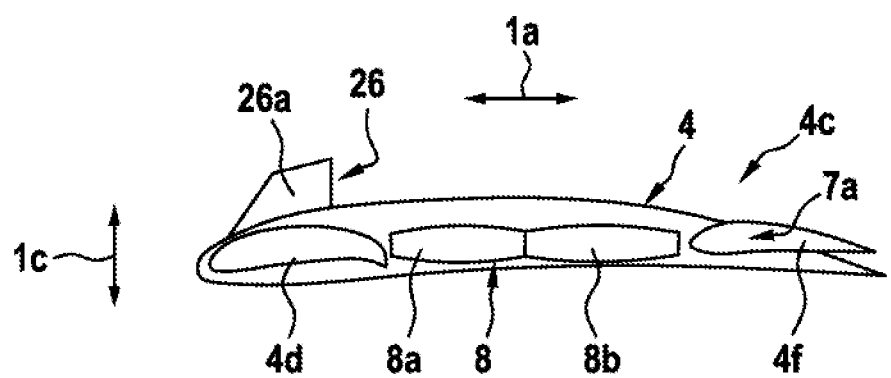
FIG. 17 shows a sectional view of the wing, the thrust producing unit and the vortex generator of FIG. 16, seen along a cut line XVII-XVII in FIG. 16.

FIG. 17 shows the front wing 4, resp. the star board side front half wing 4c, of FIG. 16 with the rotor assembly 8 having the rotor blades 8a, 8b of FIG. 16 for further illustrating the vortex generator 26 of FIG. 16. The latter is preferably formed by the fins 26a, which are preferentially as small and lightweight as possible without influencing their desired functioning.

Figure 18:
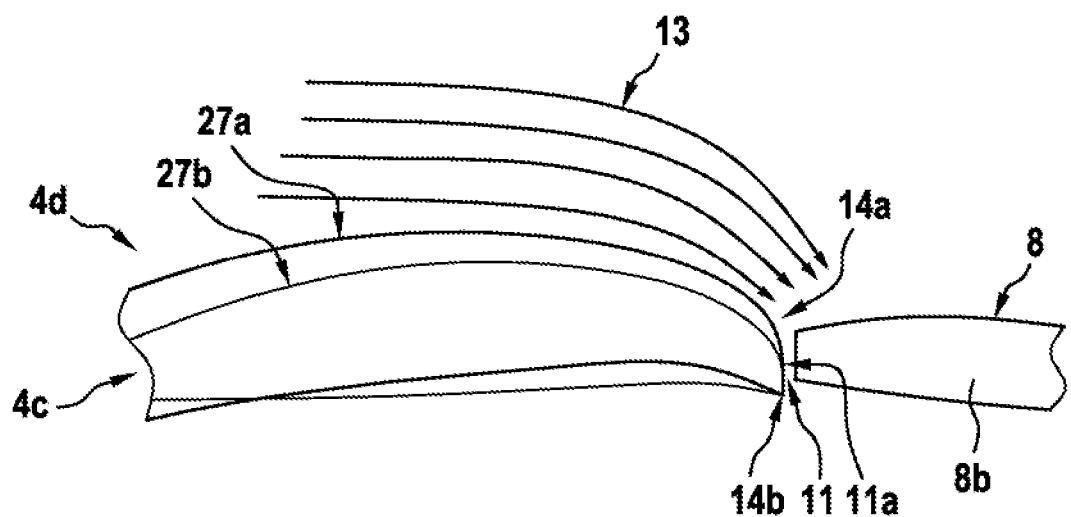
FIG. 18 shows the arrangement of FIG. 4 according to a first variant.

FIG. 18 shows the rotor assembly 8 of FIG. 4, as well as the front section 4d of the front wing 4, resp. the star board side front half wing 4c, of FIG. 4. According to FIG. 4, the rotor assembly 8 is accommodated in the air duct 11 with the front side duct wall 11a, and the front section 4d is provided with the rounded edge 14a and the sharp corner 14b.

However, in contrast to FIG. 4 the advancing rotor blade 8b is shown instead of the retreating rotor blade 8a. Furthermore, also in contrast to FIG. 4, the front section 4d now preferably exhibits at least a first wing profile 27a and a second wing profile 27b. More specifically, according to one aspect a respective shape of an overall wing profile of the front section 4d changes from the first wing profile 27a to the second wing profile 27b over the spanwise length of the front section 4d such that the inflow air stream 13 of FIG. 8, part (A) can e. g. be modified resp. influenced such that the angle of attack of the real air flow 18 of FIG. 8, part (B) at the advancing rotor blade 8b is decreased. Accordingly, lift generated by means of the advancing rotor blade 8b is decreased. Thus, distribution of generated lift can be equalized advantageously.

Figure 19:
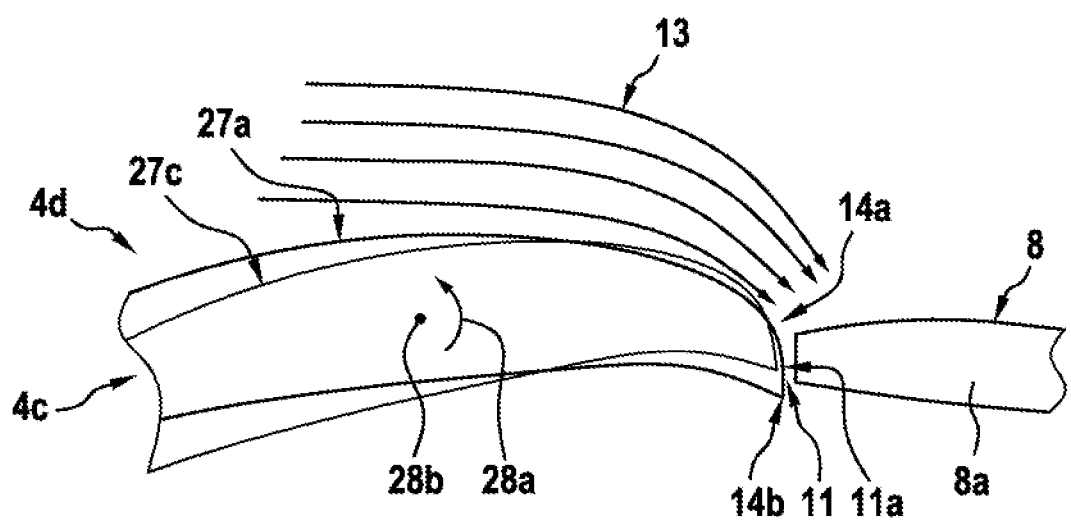
FIG. 19 shows the arrangement of FIG. 4 according to a second variant.

FIG. 19 shows the rotor assembly 8 with the retreating rotor blade 8a of FIG. 4, as well as the front section 4d of the front wing 4, resp. the star board side front half wing 4c, of FIG. 4. According to FIG. 4, the rotor assembly 8 is accommodated in the air duct 11 with the front side duct wall 11a, and the front section 4d is provided with the rounded edge 14a and the sharp corner 14b.

However, in contrast to FIG. 4 the front section 4d now preferably exhibits at least the first wing profile 27a of FIG. 18 and another wing profile 27c. More specifically, according to one aspect a respective shape of an overall wing profile of the front section 4d changes from the first wing profile 27a to the other wing profile 27c over the spanwise length of the front section 4d such that the inflow air stream 13 of FIG. 8, part (A) can e. g. be modified resp. influenced such that the angle of attack of the real air flow 18 of FIG. 8, part (B) at the retreating rotor blade 8a is increased. Accordingly, lift generated by means of the retreating rotor blade 8a is increased. Thus, distribution of generated lift can be equalized advantageously.

More specifically, the other wing profile 27c preferably corresponds to the first wing profile 27a, which is twisted in a twist rotation direction around a predetermined twist rotation axis. An exemplary twist rotation direction is illustratively labeled with the reference number 28a and an exemplary predetermined twist rotation axis is illustratively labeled with the reference number 28b.

It should be noted that the features described with reference to FIG. 18 and FIG. 19 can advantageously be combined. Thus, the distribution of generated lift can further be equalized.

Figure 20:
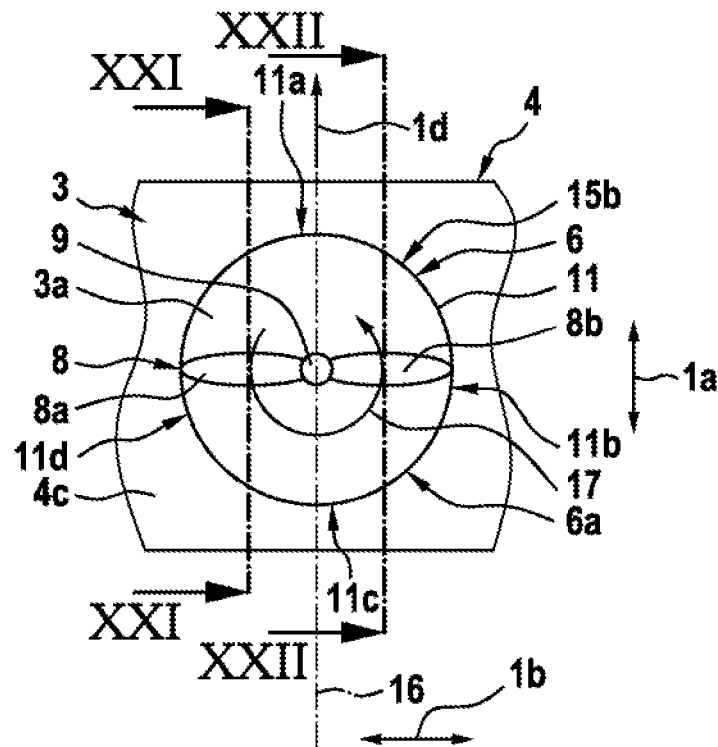
FIG. 20 shows a top view of the thrust producing unit and the wing of FIG. 3.

FIG. 20 shows a portion of an underside of the front wing 4, resp. the star board side front half wing 4c, of FIG. 3 with the rotor assembly 8 having the rotor blades 8a, 8b of FIG. 3. The rotor assembly 8 is accommodated in the shrouding 6a, which is provided with the Gurney flap 15b of FIG. 6.

Figure 21:
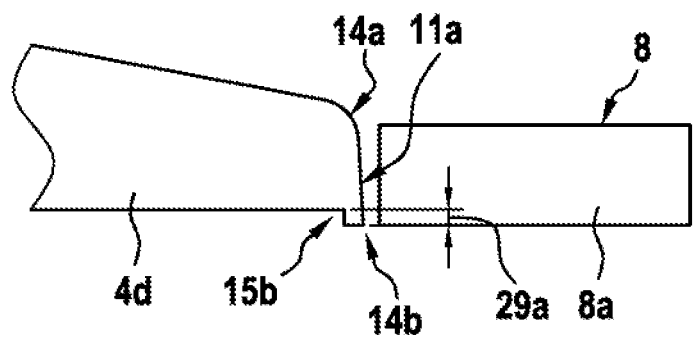
FIG. 21 shows a sectional view of the wing and the thrust producing unit of FIG. 20, seen along a cut line XXI-XXI in FIG. 20.

FIG. 21 shows the rotor assembly 8 with the rotor blade 8a of FIG. 20, as well as the front section 4d of FIG. 4 of the front wing 4, resp. the star board side front half wing 4c, of FIG. 20, which is provided with the Gurney flap 15b. According to one aspect, the Gurney flap 15b exhibits a height 29a, which is illustratively comparatively small.

Figure 22:
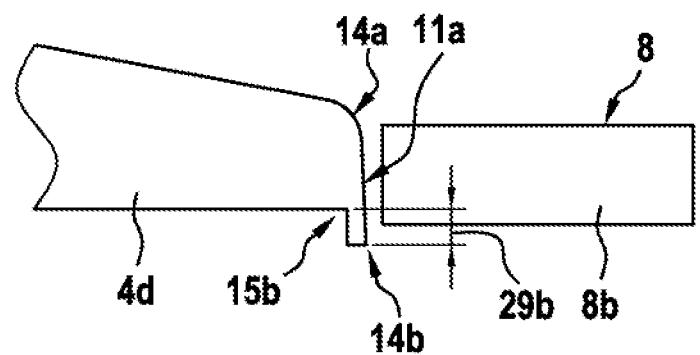
FIG. 22 shows a sectional view of the wing and the thrust producing unit of FIG. 20, seen along a cut line XXII-XXII in FIG. 20.

FIG. 22 shows the rotor assembly 8 with the rotor blade 8a of FIG. 20, as well as the front section 4d of FIG. 4 of the front wing 4, resp. the star board side front half wing 4c, of FIG. 20, which is provided with the Gurney flap 15b. According to one aspect, the Gurney flap 15b exhibits a height 29b, which is illustratively greater than the height 29a of FIG. 21. Thus, distribution of generated lift can be equalized advantageously.

Figure 23:
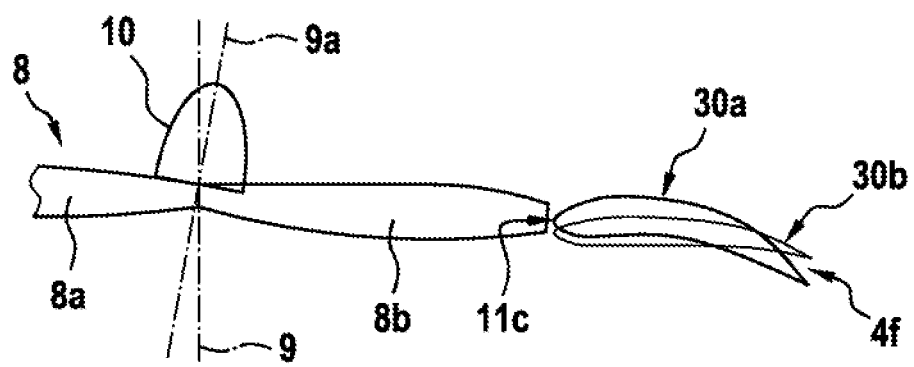
FIG. 23 shows an enlarged detail of a rear section of the thrust producing unit of FIG. 3 according to one aspect.

FIG. 23 shows the rotor assembly 8 with the advancing rotor blade 8b of FIG. 3, as well as the rear section 4f of the front wing 4, resp. the star board side front half wing 4c, of FIG. 3. FIG. 23 further illustrates the rear side duct wall 11c of the air duct 11 of FIG. 3 in more detail.

According to one aspect, the rear section 4f preferably exhibits at least a first wing profile 30a and a second wing profile 30b. More specifically, according to one aspect a respective shape of an overall wing profile of the rear section 4f changes from the first wing profile 30a to the second wing profile 30b over the spanwise length of the rear section 4f, wherein the second wing profile 30b preferably implements a lift decreasing wing profile, such that an air flow at the rear section 4f resp. the rear side duct wall 11c can e. g. be modified resp. influenced such that lift generated by means of the advancing rotor blade 8b is decreased. This can be achieved by increasing a respective downward air flow at the rear section 4f resp. the rear side duct wall 11c, thereby decreasing a corresponding angle of attack at the advancing rotor blade 8b. Thus, distribution of generated lift can be equalized advantageously.

Figure 24:
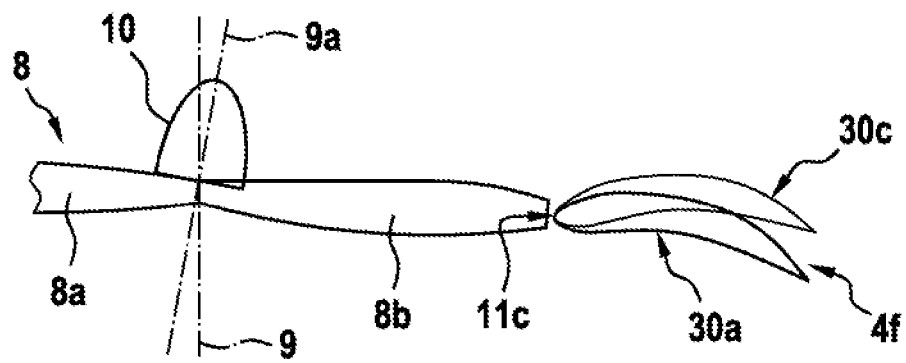
FIG. 24 shows the enlarged detail of a rear section of the thrust producing unit of FIG. 3 according to another aspect.

FIG. 24 shows the rotor assembly 8 with the retreating rotor blade 8a of FIG. 3, as well as the rear section 4f of the front wing 4, resp. the star board side front half wing 4c, of FIG. 3. FIG. 24 further illustrates the rear side duct wall 11c of the air duct 11 of FIG. 3 in more detail.

According to one aspect, the rear section 4f exhibits at least the first wing profile 30a and another wing profile 30c. More specifically, according to one aspect a respective shape of an overall wing profile of the rear section 4f changes from the first wing profile 30a to the other wing profile 30c over the spanwise length of the rear section 4f, wherein the other wing profile 30c preferably implements a lift increasing wing profile, such that an air flow at the rear section 4f resp. the rear side duct wall 11c can e. g. be modified resp. influenced such that lift generated by means of the retreating rotor blade 8a is increased. This can be achieved by decreasing a respective downward air flow at the rear section 4f resp. the rear side duct wall 11c, thereby increasing a corresponding angle of attack at the retreating rotor blade 8a. Thus, distribution of generated lift can be equalized advantageously.

It should be noted that the features described with reference to FIG. 23 and FIG. 24 can advantageously be combined. Thus, the distribution of generated lift can further be equalized.

Figure 25:
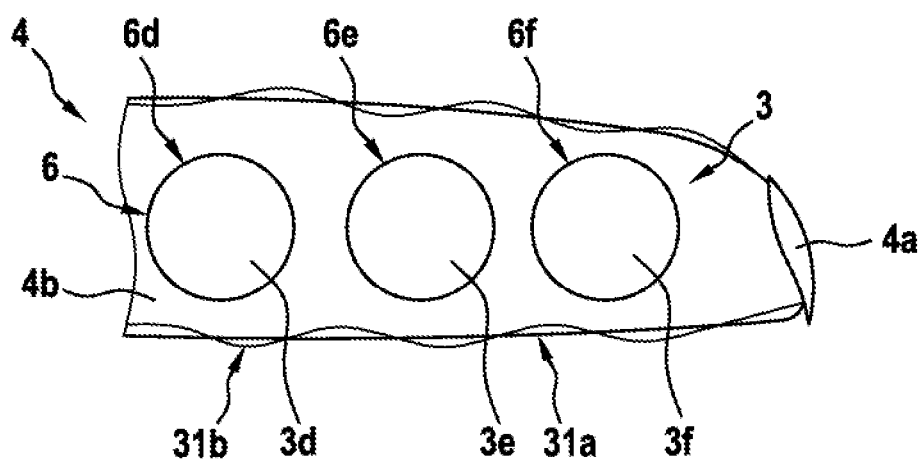
FIG. 25 shows a top view of one wing of FIG. 1 according to a variant.

FIG. 25 shows the board side front half wing 4b of FIG. 1 with a simple planform 31a, as illustrated in FIG. 1. This simple planform illustratively corresponds to a conventional planform of airplane wings.

According to one aspect, the board side front half wing 4b exhibits a modified planform in order to decrease lift at respectively advancing rotor blades. Such a planform modification may be provided instead of, or in addition to, the vortex generator 26 of FIG. 16. By way of example, an undulated modified planform 31b is illustrated.

It should be noted that the undulated modified planform 31b is only illustrated by way of example with respect to the board side front half wing 4b, but not for restricting the present invention accordingly. Instead, the undulated modified planform 31b may similarly be applied to each other one of the half wings 4c, 5b, 5c of FIG. 1.

Figure 26:
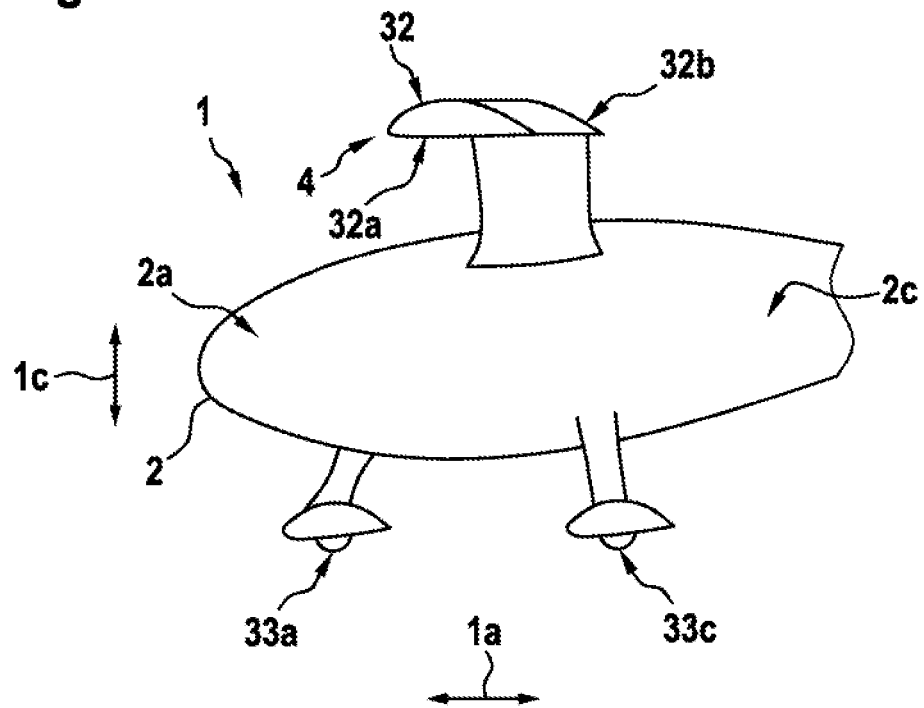
FIG. 26 shows a side view of a part of the inventive multirotor aircraft of FIG. 1 with a split gullwing and a wheel-type landing gear according to one aspect.

FIG. 26 shows the multirotor aircraft 1 of FIG. 1 with the fuselage 2. More specifically, only a portion of the star board side 2c of the multirotor aircraft 1 with the front wing 4, as well as the longitudinal direction 1a and the vertical direction 1c, are illustrated.

However, in contrast to FIG. 1, where the front wing 4 is split into the board side front half wing 4b and the star board side front half wing 4c, which are respectively directly mounted to the board side 2b and the star board side 2c of the fuselage 2, the front wing 4 is now preferably implemented as a split gullwing 32 that is mounted on top of the fuselage 2. Therefore, the split gullwing 32 preferably comprises a front part 32a, a board side rear part 32b and a star board side rear part (32c in FIG. 27), as described below with reference to FIG. 27.

According to one aspect, the split gullwing 32 is spaced from the fuselage 2 in the vertical direction 1c of FIG. 1 by a predetermined distance. This predetermined distance should be selected great enough, according to the common knowledge of the skilled person, to avoid obstacle damage from dispersed objects at hover. Thus, also injury of persons around the multirotor aircraft 1 e. g. during take-off can advantageously be reduced.

It should be noted that the implementation of the front wing 4 as the split gullwing 32 is merely described by way of example and not for limiting the invention accordingly. Instead, the rear wing 5 of FIG. 1 may additionally, or alternatively, also be implemented as a split gullwing according to the teachings of FIG. 26.

According to one aspect, the multirotor aircraft 1 now further comprises a front wheel 33a, a board side rear wheel (33b in FIG. 28) and a star board side rear wheel 33c. The front wheel 33a is illustratively spaced from the board side rear wheel (33b in FIG. 28) and the star board side rear wheel 33c in the longitudinal direction 1a of FIG. 1 by a predetermined distance. The front wheel 33a, the board side rear wheel (33b in FIG. 28) and the star board side rear wheel 33c preferably define a preferentially electrically controlled landing gear of the multirotor aircraft 1.

At least two wheels of the front wheel 33a, the board side rear wheel (33b in FIG. 28) and the star board side rear wheel 33c are preferably provided with a respectively associated electrical motor, which is preferentially arranged inside of resp. adjacent to the wheel as part of the landing gear. In other words, any mechanical devices for controlling the landing gear during taxiing are preferably omitted. Furthermore, preferably at least one wheel and, preferentially, the front wheel 33a, is free to rotate. Thus, by controlling respective rotation speeds and directions of the board side rear wheel (33b in FIG. 28) and the star board side rear wheel 33c, it is possible to taxi the multirotor aircraft 1 in any selected direction forward and rearward and also to turn the multirotor aircraft 1 by reverse rotational directions.

Figure 27:
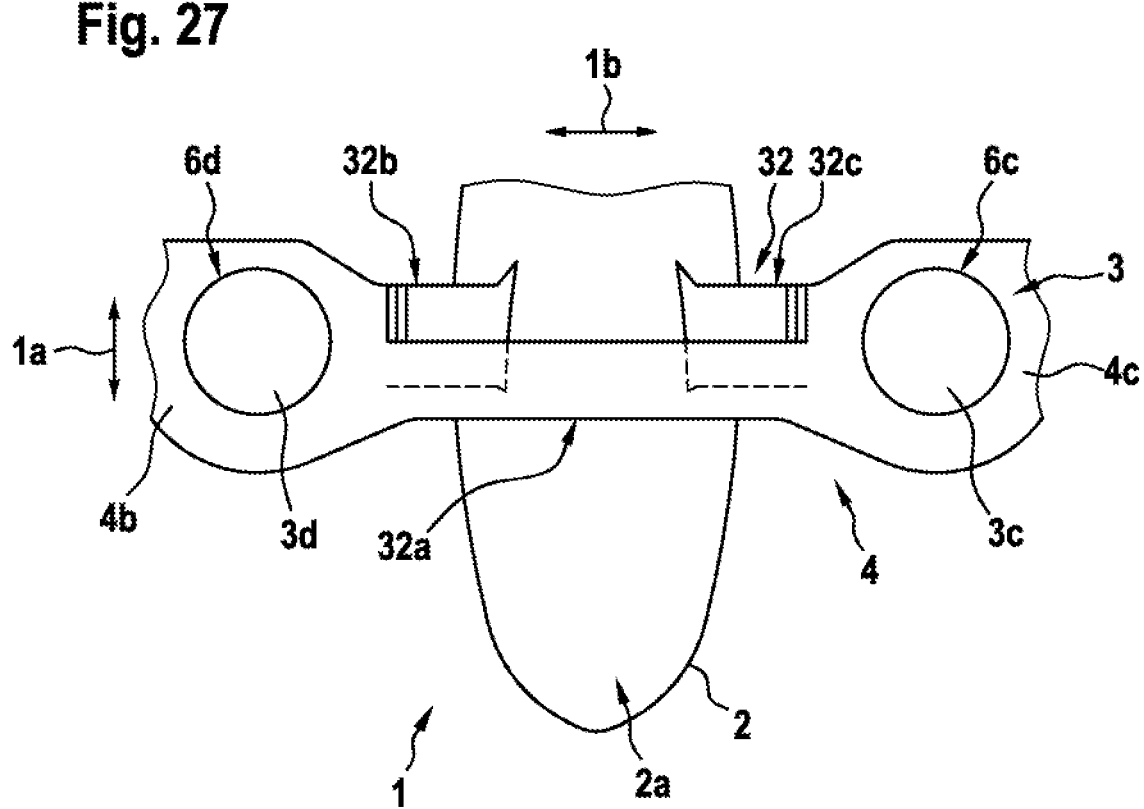
FIG. 27 shows a top view of the inventive multirotor aircraft according to FIG. 26.

FIG. 27 shows the multirotor aircraft 1 of FIG. 26, with the fuselage 2 and the split gullwing 32. The split gullwing 32 preferably comprises the board side front half wing 4b and the star board side front half wing 4c of FIG. 1, as well as the front part 32a and the board side rear part 32b of FIG. 26, and furthermore a star board side rear part 32c.

According to one aspect, the board side front half wing 4b and the star board side front half wing 4c are connected to each other via the front part 32a. Preferably, the front part 32a is kept straight without any significant kinks. Therefore, all bending moments in the center of the split gullwing 32 can be transferred via a straight beam that implements the front part 32a.

Preferably, the split gullwing 32 as a unit is, similar to the inner part of an airplane gull wing, connected to the fuselage 2 via two inclined, aerodynamically shaped short wings which are implemented by means of the board side rear part 32b and the star board side rear part 32c. The board side rear part 32b and the star board side rear part 32c are preferably mainly located in the longitudinal direction 1a of FIG. 26 at least partly behind the front part 32a. All loads from the split gullwing 32 to the fuselage 2 are transferred via the board side rear part 32b and the star board side rear part 32c.

Preferably, the board side rear part 32b and the star board side rear part 32c are connected to the front part 32a. The connection may be at or behind a location of a highest thickness of the front part 32a.

Figure 28:
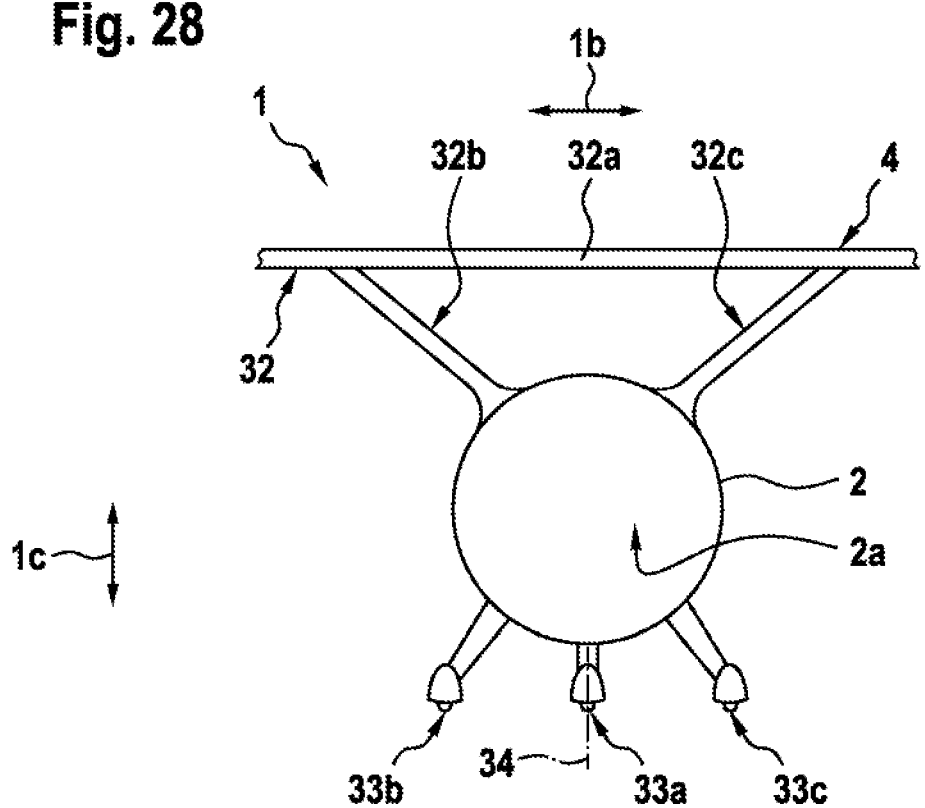
FIG. 28 shows a front view of the inventive multirotor aircraft according to FIG. 26 and FIG. 27.

FIG. 28 shows the multirotor aircraft 1 of FIG. 26 and FIG. 27, with the fuselage 2, the split gullwing 32, and the landing gear that is formed by the front wheel 33a, a board side rear wheel 33b, and the star board side rear wheel 33c. FIG. 28 further illustrates the split gullwing 32 with the board side rear part 32b and the star board side rear part 32c of FIG. 27 that are exemplarily arranged behind the front part 32a of FIG. 27.

According to one aspect, the front wheel 33a is free to rotate around an associated rotation axis 34. Accordingly, the front wheel 33a is implemented as a so-called pushed or dragged wheel, i. e. a passive wheel that is provided without any active steering mechanism. Preferably, each one of the board side rear wheel 33b and the star board side rear wheel 33c has an associated electrical motor, as described at FIG.

26, which may be combined with a self-locking gear. In this case, no extra brake is required.

In operation of the multirotor aircraft 1, control of movement can be linked to respective pedals which can be used during flight for control of rotation around the vertical axis, i. e. around the vertical direction 1c of FIG. 1. Forward and rearward speed of the associated electrical motors of the board side rear wheel 33b and the star board side rear wheel 33c may e. g. be controlled by a lever in the multirotor aircraft 1.

More specifically, for movement of the multirotor aircraft on ground without pilot, the associated electrical motors may according to one aspect be controlled with a remote control transmitter, e. g. a remote control similar to those that are used with toy cars. Thus, the remote control transmitter can be handled from each position outside of the multirotor aircraft 1. Furthermore, the remote control transmitter can also be used of a respective cockpit of the multirotor aircraft 1. It can e. g. be fixed removable inside the fuselage 2, e.g. with a hook and loop tape, with a magnetic device or with a spring lock.

Figure 29:
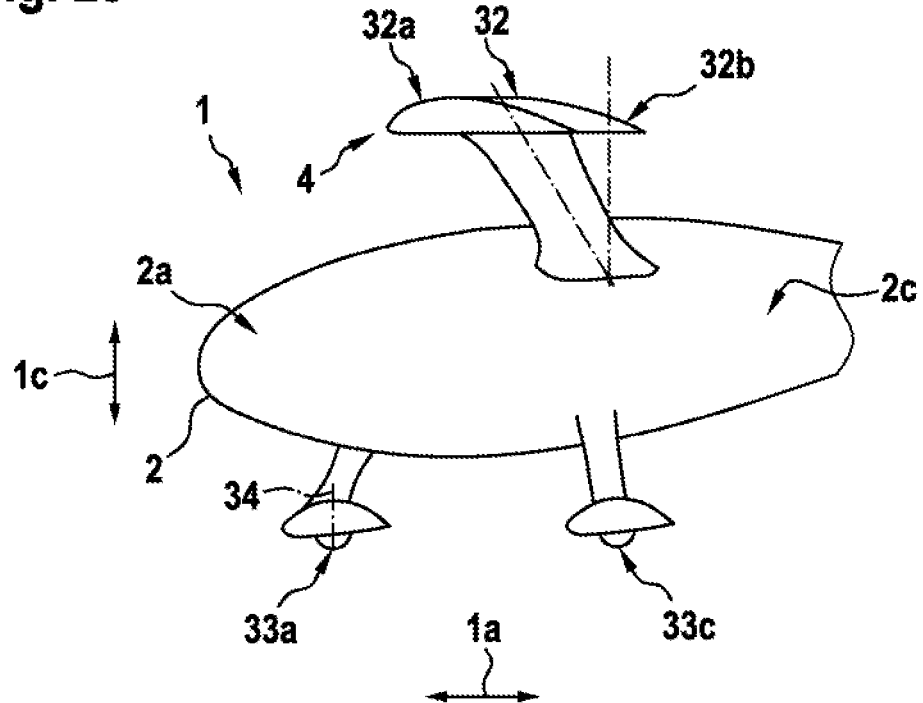
FIG. 29 shows a side view of the inventive multirotor aircraft of FIG. 26 according to a variant.

FIG. 29 shows the multirotor aircraft 1 of FIG. 26, with the fuselage 2 and the split gullwing 32. However, in contrast to FIG. 26, the split gullwing now exhibits instead of a vertical orientation a forward inclination. Similarly, a rearward inclination may be implemented.

Finally, it should be noted that modifications of the above described aspects of the present invention are also within the common knowledge of the person skilled in the art and, thus, also considered as being part of the present invention.

REFERENCE LIST

1 Multirotor aircraft
1a Aircraft longitudinal direction
1b Aircraft lateral direction
1c Aircraft vertical direction
1d Forward flight direction
2 Aircraft airframe
2a Aircraft airframe internal volume
2b Aircraft airframe board side
2c Aircraft airframe star board side
3 Thrust producing units
3a, 3b, 3c, 3d, 3e, 3f, 3g, 3h, 3i, 3j, 3k, 3l, 3m Thrust producing unit
4 Front wing
4a Front wing winglets
4b Board side front half wing
4c Star board side front half wing
4d Star board side front half wing front section
4e Front wing aerodynamic profile
4f Star board side front half wing rear section
5 Rear wing
5a Rear wing winglets
5b Board side rear half wing
5c Star board side rear half wing
5d Rear wing aerodynamic profile
6 Shrouding units
6a, 6b, 6c, 6d, 6e, 6f, 6g, 6h, 6i, 6j, 6k, 6l, 6m Shrouding
6n Shroudings interspace
7 Control surfaces
7a, 7b Aileron
7c, 7d Elevator
7e, 7f, 7g Rudder
8 Rotor assembly
8a, 8b Rotor blades
9 Inclined rotation axis
9a Uninclined rotation axis
9b Inclination angle
10 Gearbox fairing
10a Gearbox fairing struts
11 Air duct
11a Front side duct wall
11b Board side duct wall
11c Rear side duct wall
11d Star board side duct wall
11e Air inlet region
11f Air outlet region
12 Front section aerodynamic profile
12a Highest profile thickness
12b Predetermined length
12c Rear section aerodynamic profile
13 Inflow air stream
14a Rounded edge
14b Sharp corner
15a Simple cut edge
15b Gurney flap
15c Covered Gurney flap
16 Axis of symmetry
17 Rotation direction
18 Real air flow at rotor assembly
19 Redirected airflow at advancing rotor blade
20 Airflow with reduced speed at advancing rotor blade
21 Redirected airflow with increased angle of attack at retreating rotor blade
22 Redirected airflow with decreased angle of attack at advancing rotor blade
23 Stator blade at retreating rotor blade side
24 Stator blade at advancing rotor blade side
25 Airflow behind stator blade at advancing rotor blade side
26 Vortex generator
26a Vertical fins
27a Star board side front half wing front section
27 profile
27b Modified profile shape
27c Twisted profile shape
28a Twist rotation direction
28b Twist rotation axis
29a Smaller Gurney flap height
29b Greater Gurney flap height
30a Star board side front half wing rear section profile
30b Lift decreasing profile shape
30c Lift increasing profile shape
31a Simple planform
31b Modified planform
32 Split gullwing
32a Front part of split gullwing
32b Board side rear part of split gullwing
32c Star board side rear part of split gullwing
33a Front wheel
33b Board side rear wheel
33c Star board side rear wheel
34 Front wheel rotation axis

What is claimed is:

1. A multirotor aircraft with an airframe and at least one wing that is mounted to the airframe, the at least one wing being provided with at least four thrust producing units for producing thrust in a predetermined direction, the at least four thrust producing units being arranged in spanwise direction of the at least one wing, wherein each one of the at least four thrust producing units comprises at least one rotor assembly that is accommodated in an associated shrouding, the associated shrouding being integrated into the at least one wing, wherein the associated shrouding defines an air duct that is axially delimited by an air inlet region and an air outlet region, the air duct being cylindrical, wherein the air duct comprises a front side duct wall, a board side duct wall, a rear side duct wall, and a star board side duct wall, wherein at least the front side duct wall and the board side and star board side duct walls exhibit different heights in axial direction of the air duct, wherein the different heights define an undulated geometry, and wherein the air inlet region exhibits in circumferential direction of the air duct at least two different aerodynamic profiles.

2. The multirotor aircraft of claim 1, wherein the height of the board side and star board side duct walls is greater than the height of the front side duct wall, which is greater than a height of the rear side duct wall.

3. The multirotor aircraft of claim 1, wherein the front side duct wall is connected to the board side duct wall and the star board side duct wall by means of an aerodynamically shaped transition.

4. The multirotor aircraft of claim 1, wherein the at least one wing is provided with an aerodynamic profile, wherein a front section of the at least one wing that is located with respect to a forward flight direction of the multirotor aircraft upstream of the air duct is provided with a first aerodynamic profile that differs from the aerodynamic profile of the at least one wing.

5. The multirotor aircraft of claim 4, wherein the first aerodynamic profile is shaped in spanwise direction of the at least one wing such as to create in sections different angles of attack of an inflow air stream flowing into the air duct in operation.

6. The multirotor aircraft of claim 4, wherein a rear section of the at least one wing that is located with respect to the forward flight direction of the multirotor aircraft downstream of the air duct is provided with a second aerodynamic profile that differs from the aerodynamic profile of the at least one wing.

7. The multirotor aircraft of claim 1, wherein the air outlet region is provided in circumferential direction of the air duct at least partly with a sharp corner.

8. The multirotor aircraft of claim 7, wherein the sharp corner is implemented by a simple cut edge.

9. The multirotor aircraft of claim 7, wherein the sharp corner is implemented by a Gurney flap or a covered Gurney flap.

10. The multirotor aircraft of claim 1, wherein stator blades are arranged inside of the air duct, the stator blades being configured to redirect at least a portion of an inflow air stream in a predefined direction.

11. The multirotor aircraft of claim 1, wherein at least one vortex generator is provided adjacent to the air duct for redirecting at least a portion of an inflow air stream in a predefined direction.

12. The multirotor aircraft of claim 1, wherein the at least one wing comprises a board side half wing and a star board side half wing that are mounted to the airframe, the board side half wing being provided with at least two thrust producing units that are arranged in spanwise direction of the board side half wing, and the star board side half wing being provided with at least two thrust producing units that are arranged in spanwise direction of the star board side half wing.

13. The multirotor aircraft of claim 1, wherein at least one front wing and at least one rear wing are mounted to the airframe, wherein the at least one front wing is provided with at least four thrust producing units for producing thrust in a predetermined direction, the at least four thrust producing units of the at least one front wing being arranged in spanwise direction of the at least one front wing, and wherein the at least one rear wing is provided with at least four thrust producing units for producing thrust in a predetermined direction, the at least four thrust producing units of the at least one rear wing being arranged in spanwise direction of the at least one rear wing.

14. The multirotor aircraft of claim 1, wherein at least one additional thrust producing unit is provided for producing thrust in longitudinal direction of the multirotor aircraft in operation, the at least one additional thrust producing unit being preferably accommodated in a wing-independent shrouding.

* * * * *